United States Patent
Firey

[19]

[11] Patent Number: 6,116,207
[45] Date of Patent: Sep. 12, 2000

[54] FUEL AIR MIXER AND PROPORTIONER

[76] Inventor: Joseph Carl Firey, P.O. Box 15514, Seattle, Wash. 98115

[21] Appl. No.: 09/476,891

[22] Filed: Jan. 3, 2000

[51] Int. Cl.$^7$ ............................. F02B 17/00; F02M 59/30
[52] U.S. Cl. ......................... 123/250; 123/295; 123/430; 123/504
[58] Field of Search ................................. 123/73 C, 250, 123/294, 295, 298, 305, 429, 430, 445, 495, 504, 531

[56] References Cited

U.S. PATENT DOCUMENTS

| | | | |
|---|---|---|---|
| 5,119,779 | 6/1992 | Plohberger et al. | 123/250 |
| 5,813,379 | 9/1998 | Firey | 123/143 B |
| 5,899,188 | 5/1999 | Firey | 123/250 |
| 5,899,195 | 5/1999 | Firey | 123/295 X |
| 5,967,100 | 10/1999 | Firey | 123/279 X |

*Primary Examiner*—Tony M. Argenbright

[57] ABSTRACT

Improved combination apparatus is described for creating a fuel rich mixture in a displacer volume, separate from the combustion chamber of a piston internal combustion engine. This mixture is subsequently delivered into the engine combustion chamber, to create a stratified mixture, which is then ignited and burned only in the engine combustion chamber. By use of such stratified mixtures, several benefits over the prior art can be achieved, including: reduced engine friction losses, and consequently improved efficiency; reduced soot formation and engine exhaust emissions; more complete utilization of available air and increased engine power per unit of displacement.

9 Claims, 12 Drawing Sheets

FUEL AIR MIXER AND PROPORTIONER

The invention described herein is related to my following U.S. Patents:

1. U.S. Pat. No. 5,813,379, Sep. 29, 1998, "Displacer Jet Igniter";
2. U.S. Pat. No. 5,899,188, May 4, 1999, "Air Fuel Vapor Stratifier";
3. U.S. Pat. No. 5,899,195, May 4, 1999, "Stratifier Apparatus for Engines";
4. U.S. Pat. No. 5,967,100, Oct. 19, 1999, "Combustion Process for Compression Ignition Engines".

BACKGROUND OF THE INVENTION

1. Field of the Invention

This invention is in the fields of air fuel mixture stratifiers and igniters for internal combustion engines of the piston and cylinder type, wherein a jet of air fuel mixture can be used to create a stratified principal air fuel mixture in the combustion chamber of the engine cylinder.

2. Description of the Prior Art

The Hesselman engine combustion process, and the more recent Texaco combustion process, are examples of early prior art air fuel mixture stratifiers, which created a stratified principal air fuel mixture in the engine combustion chamber. Descriptions of examples of these prior art mixture stratifier schemes are presented in the following references:

(i) "A High Power Spark-Ignition Fuel Injection Engine," Trans. SAE, Vol. 35, p. 431, 1934;
(ii) "The Elimination of Combustion Knock-Texaco Combustion Process," SAE Quarterly Trans., Vol. 5, p. 26, 1951;
(iii) "The Elimination of Combustion Knock," E. Barber, J. Malin, J. Mikita, Jour. of the Franklin Institute, Vol. 241, p. 275, April 1946;

In these prior art Texaco combustion processes, a jet of liquid fuel was injected into the engine combustion chamber, near the end of the compression stroke. The air inside the engine cylinder was set into rotary motion during intake, by use of shrouded intake valves, or specially oriented intake ports and manifolds. The liquid fuel spray was carried by the rotating air into which it was injected, toward a spark igniter. When this stratified air fuel mixture reached the spark, evaporated portions of the fuel, diffused into the surrounding air, were ignited by the spark, and a burning zone was thus created. The heat generated in this burning zone, evaporated those fuel portions unevaporated at the time of spark ignition and subsequent interdiffusion of air and thusly evaporated fuel maintained the burning zone, until most of the injected liquid fuel was burned. This burning process somewhat resembles that of a conventional liquid fueled oil burner, except that it is carried out intermittently and at high pressure.

Since air fuel vapor mixture is burned very shortly after being created, time is not available for expiration of the compression ignition delay period, which leads to engine knock. Thus one principal advantage of the Texaco combustion process was that high engine compression ratio, and hence high engine efficiency, could be achieved while using fuels of low octane number, and hence low knock resistance. Such low octane number fuels are generally of lower cost than high octane number fuels.

Engine torque was adjusted, for this Texaco combustion process, by proportionally adjusting the liquid fuel quantity injected into the engine cylinder, using fuel injection pumps and nozzles very similar to diesel engine injection pumps and nozzles. Since a stratified mixture was used, the air quantity inside the engine cylinder did not require adjustment, and an intake manifold throttle valve was not used. In consequence, the engine efficiency losses due to intake air throttling were avoided. Hence another principal advantage of the Texaco combustion process, was that high engine efficiency could be obtained at low engine torque since the usual throttling and consequent pumping power loss was avoided.

Liquid fuel, unevaporated at the start of burning, becomes surrounded by very hot burned gases, essentially devoid of oxygen. Rapid evaporation of liquid followed, but in the absence of oxygen, this evaporated fuel produced a high yield of soot particles, in a manner similar to soot production in diesel engines. Appreciable portions of this soot survives to exhaust to create an undesirable exhaust soot emission.

The injected liquid fuel volume, being much smaller than the air volume needed for burning, it is difficult to distribute the liquid spray particles uniformly throughout the cylinder air mass. In consequence the available cylinder air mass is incompletely utilized for burning. For this reason a larger engine displacement is needed, resulting in increased engine weight and cost than for a comparable conventional gasoline engine.

The liquid fuel is injected at high pressure, and the fuel injector must withstand subsequent peak combustion pressures and the high heat transfer rates which follow. The fuel injection equipment is thus essentially similar to that used with conventional diesel engines and is expensive.

These then are the principal disadvantages of the Texaco combustion process; that exhaust soot is emitted, that a larger engine displacement is needed, and that expensive fuel injection equipment is required. It would be desirable to have available an engine system capable of realizing the knock suppression and reduced pumping friction loss characteristics of this Texaco combustion system, but possessing reduced soot emissions, better air utilization, and lower cost fuel injection apparatus.

3. Definitions

The term piston internal combustion engine is used herein and in the claims to mean an internal combustion engine of the piston and cylinder type, with connecting rod and crankshaft or equivalent, such as the Wankel engine type, or opposed piston type engines. Each piston internal combustion engine comprises at least one combined means for compressing and expanding gases, each combined means comprising: an internal combustion engine mechanism comprising a variable volume chamber for compressing and expanding gases, and drive means, such as a connecting rod and crankshaft, for driving said internal combustion engine mechanism and varying the volume of said chamber through repeated cycles. Each variable volume chamber comprises a combustion chamber end at the minimum volume position of the variable volume.

Each variable volume cycle comprises a compression time interval, when said variable volume is sealed and decreasing, followed by an expansion time interval, when said variable volume is sealed and increasing, these two time intervals together being a compression and expansion time interval.

Each combined means for compressing and expanding further comprises intake means for admitting reactant gases into said variable volume chamber prior to each compression time interval and exhaust means for removing reacted gases from said variable volume chamber after each expansion time interval.

Each variable volume cycle further comprises an exhaust time interval, when said variable volume is opened to said exhaust means, followed by an intake time interval, when said variable volume is opened to said intake means, these two time intervals being an exhaust and intake time interval; said exhaust and intake time interval following after a preceding expansion time interval and preceding a next following compression time interval. For a four stroke cycle piston internal combustion engine each separate time interval occupies approximately one half engine revolution and thus one stroke of the piston. For a two stroke cycle piston internal combustion engine the expansion time interval together with the exhaust time interval occupy approximately a half engine revolution and one piston stroke, and an intake time interval followed by a compression time interval occupy the next following half engine revolution and piston stroke.

A piston internal combustion engine further comprises a source of supply of reactant gas containing appreciable oxygen gas to each said intake means for admitting reactant gases into said variable volume chamber.

A piston internal combustion engine further comprises an igniter for igniting fuel air mixtures contained within the combustion chamber of the variable volume chamber. Various types of igniters can be used, such as timed electric sparks, glow plugs, compression ignition via adequate engine compression ratio, and combinations of these igniters.

The combustion time interval is that portion of the compression and expansion time interval when ignition and burning of the air fuel mixture in the engine cylinder is intended to take place. For reasons of engine efficiency, this combustion time interval is preferably intended to occur when the variable volume chamber is at or near to its minimum volume, during or following a compression time interval.

The term reactant gas containing appreciable oxygen gas is used herein and in the claims to mean a reactant gas having a ratio of oxygen gas to inert gases at least about equal to that for air, and which may additionally comprise a principal engine fuel.

Many different types of fuels are suitable for use on internal combustion engines equipped with fuel air mixers and proportioners of this invention. The following are some examples of suitable commercial fuels:

1. Natural gas
2. Propane and butane
3. Gasoline
4. Diesel fuel and other middle distillate fuels
5. Producer gas
6. Water gas
7. Sewer gas
8. Other manufactured fuel gases In principle, any fuel which, when mixed with air or other oxygen rich gas in suitable proportions, can be spark ignited or compression ignited, is suitable for use with the invention described herein. The term stoichiometric mixture ratio is used herein and in the claims to mean that mixture ratio of fuel to oxygen which, if fully reacted, would produce only complete combustion products.

Hydrocarbon fuels are spark ignitable and flammable over a moderate range of mixture ratios, both fuel leaner and fuel richer than the stoichiometric mixture ratio. Most hydrocarbon fuels are also compression ignitable and over a wider range of mixture ratios than their spark ignitable mixture ratio range, provided adequate compression is used. Hydrocarbon fuels, undergoing compression ignition, exhibit a compression ignition time delay period, between application of compression and occurrence of ignition. This compression ignition time delay period is shortest at mixture ratios at and near to stoichiometric, becoming longer for mixture ratios both leaner and richer than stoichiometric. The octane number, or cetane number, of a hydrocarbon fuel is an indicator of its compression ignition time delay characteristics, longer time delay being indicated by higher octane number or lower cetane number.

SUMMARY OF THE INVENTION

A fuel air mixer and proportioner of this invention comprises combination means for injecting fuel and transferring air concurrently into a displaceable volume and from the variable volume chamber of a piston internal combustion engine. The resulting displacer air mixture is subsequently delivered back into the engine combustion chamber, to create a stratified mixture therein, within which ignition and burning take place. The injected fuel and transferred air are mixed together in proportions of air mass to fuel mass, sufficiently fuel richer than stoichiometric, that the compression ignition time delay period of all portions of the displacer mixture exceeds the residence time of these portions within the displaceable volume. In this way ignition and combustion occur only within the engine combustion chamber and not within the displaceable volume. Excess heat transfer to the engine cooling jacket is thusly avoided.

The fuel air mixers and proportioners described herein are an improvement upon the Stratifier Apparatus for Engines described in U.S. Pat. No. 5,899,195 and additionally achieve the several beneficial objects of this stratifier, while being capable of operation at appreciably fuel leaner displacer mixture ratios with a consequent further reduction of engine exhaust smoke and odor emissions.

BRIEF DESCRIPTION OF THE DRAWINGS

An example fuel air mixer and proportioner using a cam plus hydraulic adjustor for displacer piston driving in combination with a common rail fuel injector is shown schematically in FIG. 1.

The hydraulic bleed plus delivery pump displacer piston driver shown schematically in FIG. 2 can be used in combination with the engine cylinder pressure-driven fuel injector shown schematically in FIG. 3, as another example of the invention.

Figure 4B:
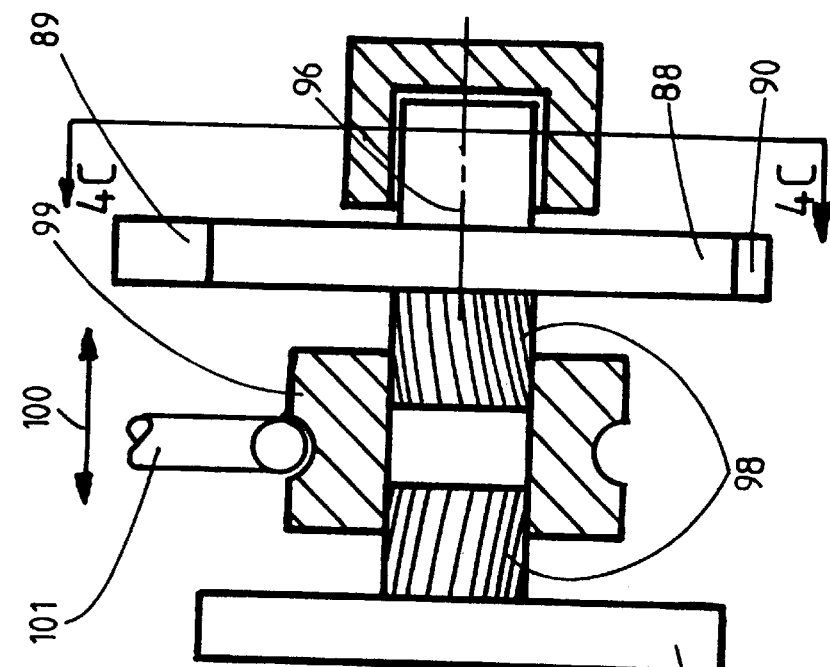
Figure 4A:
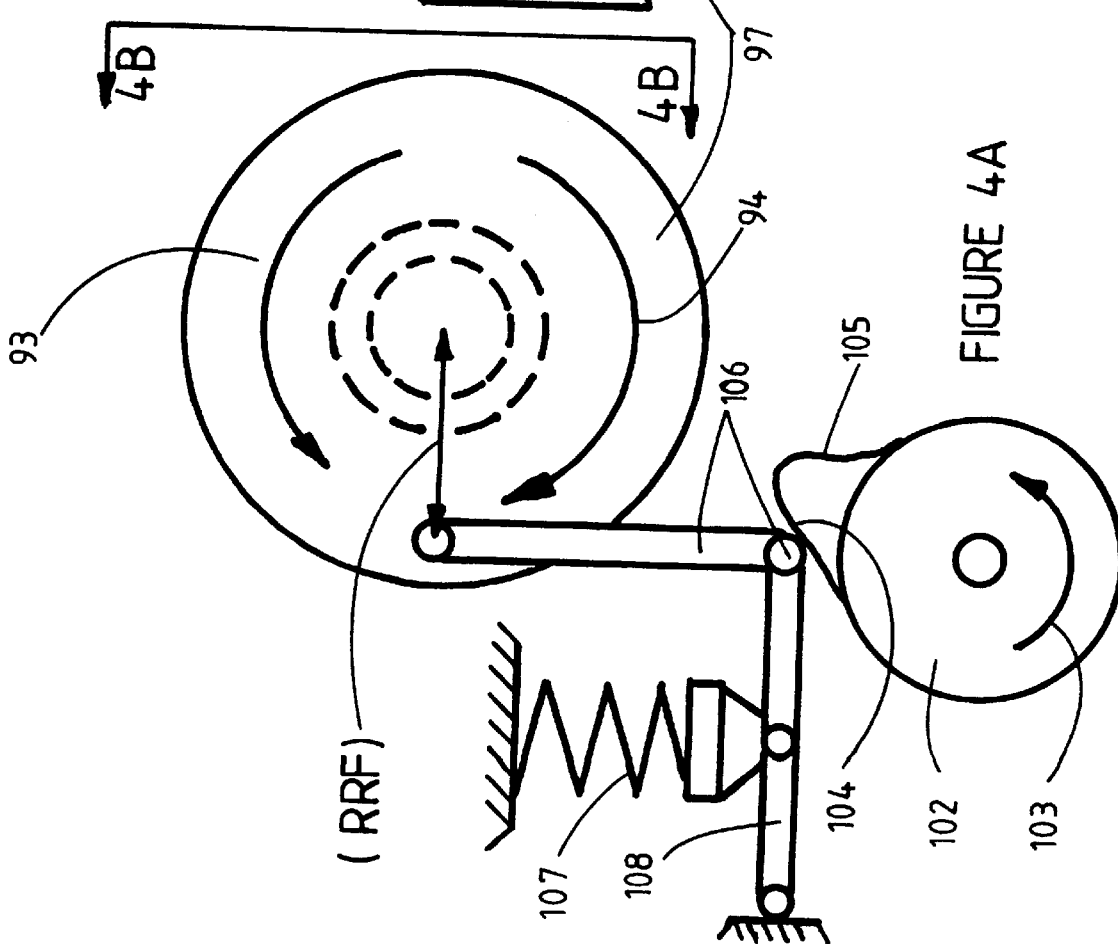
Figure 4C:
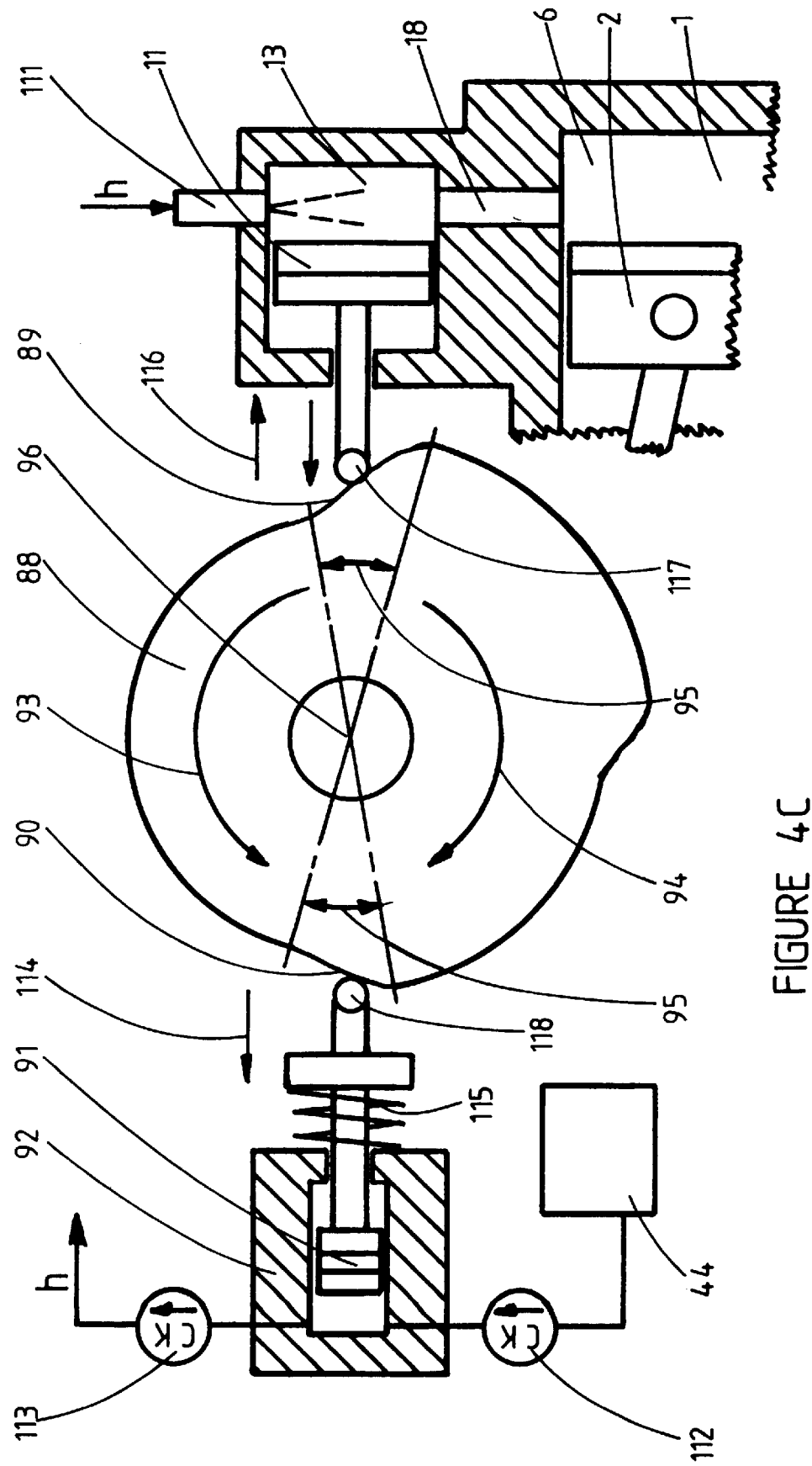

A dual cam plus phase changer mechanical example form of the invention is shown schematically in FIGS. 4A, 4B and 4C.

Figure 5:
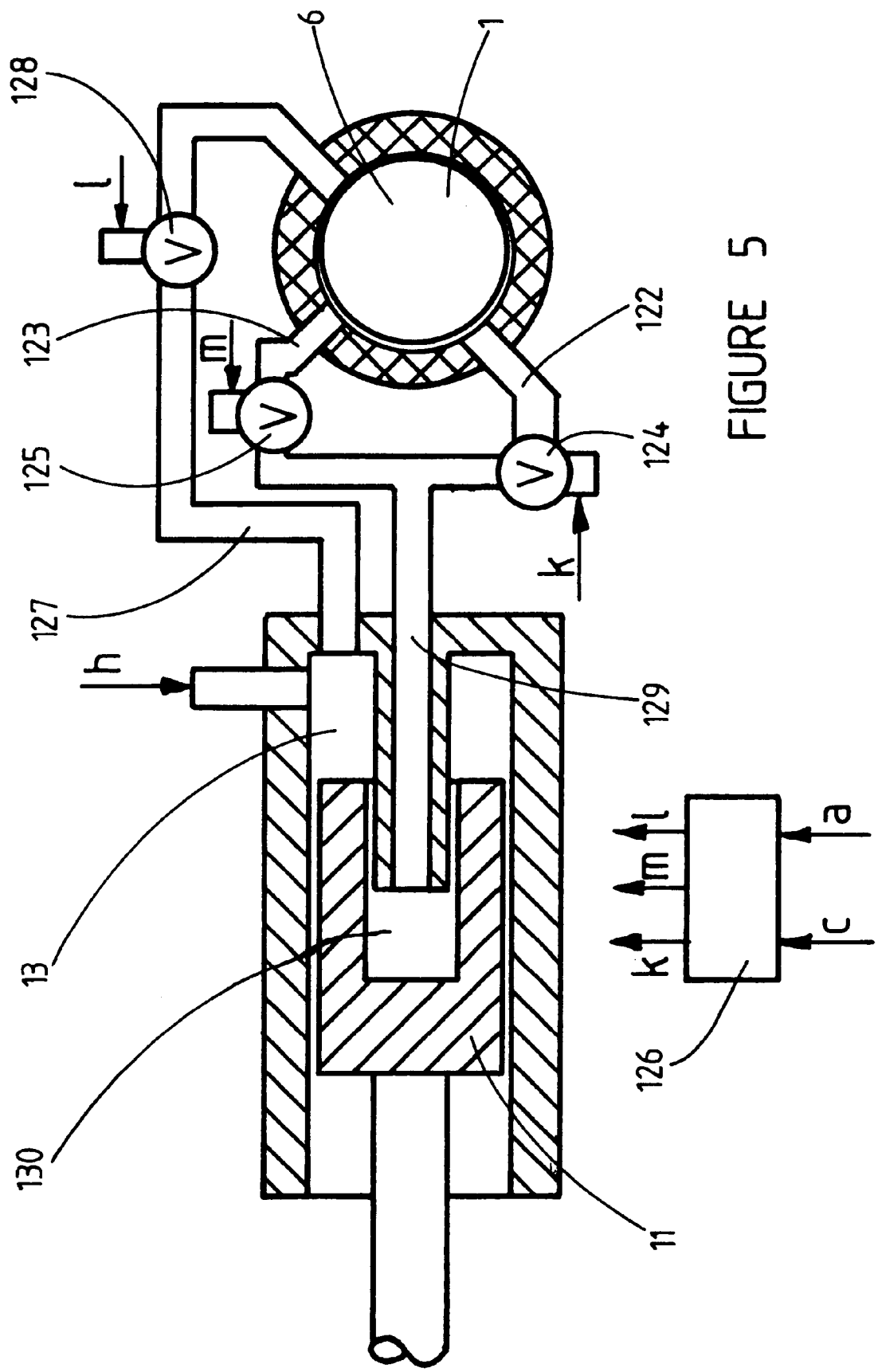
Figure 6:
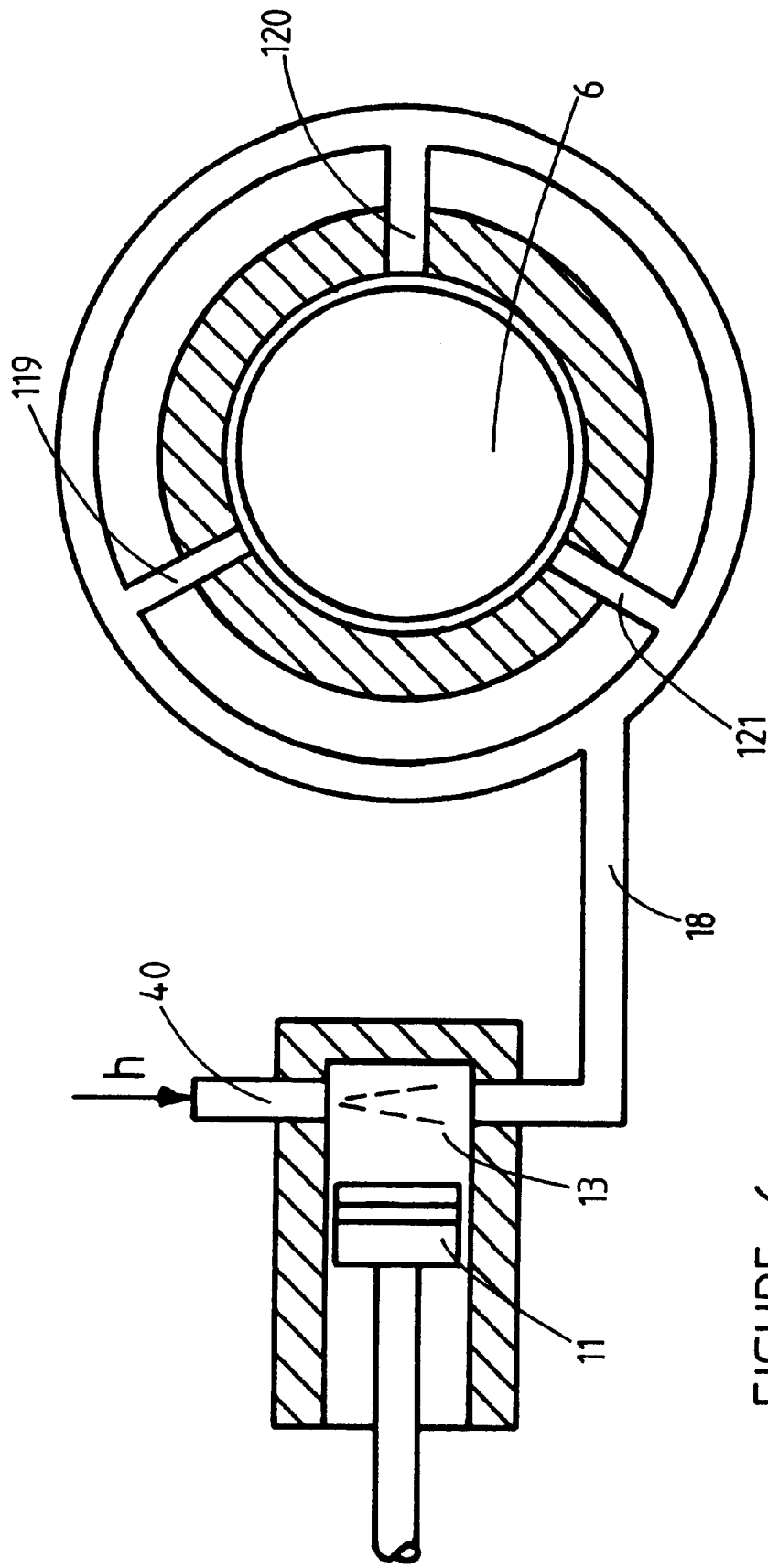

The use of multiple and valved flow passages between the engine combustion chamber and the displacer volume is illustrated schematically in FIG. 5 and FIG. 6.

Figure 1:
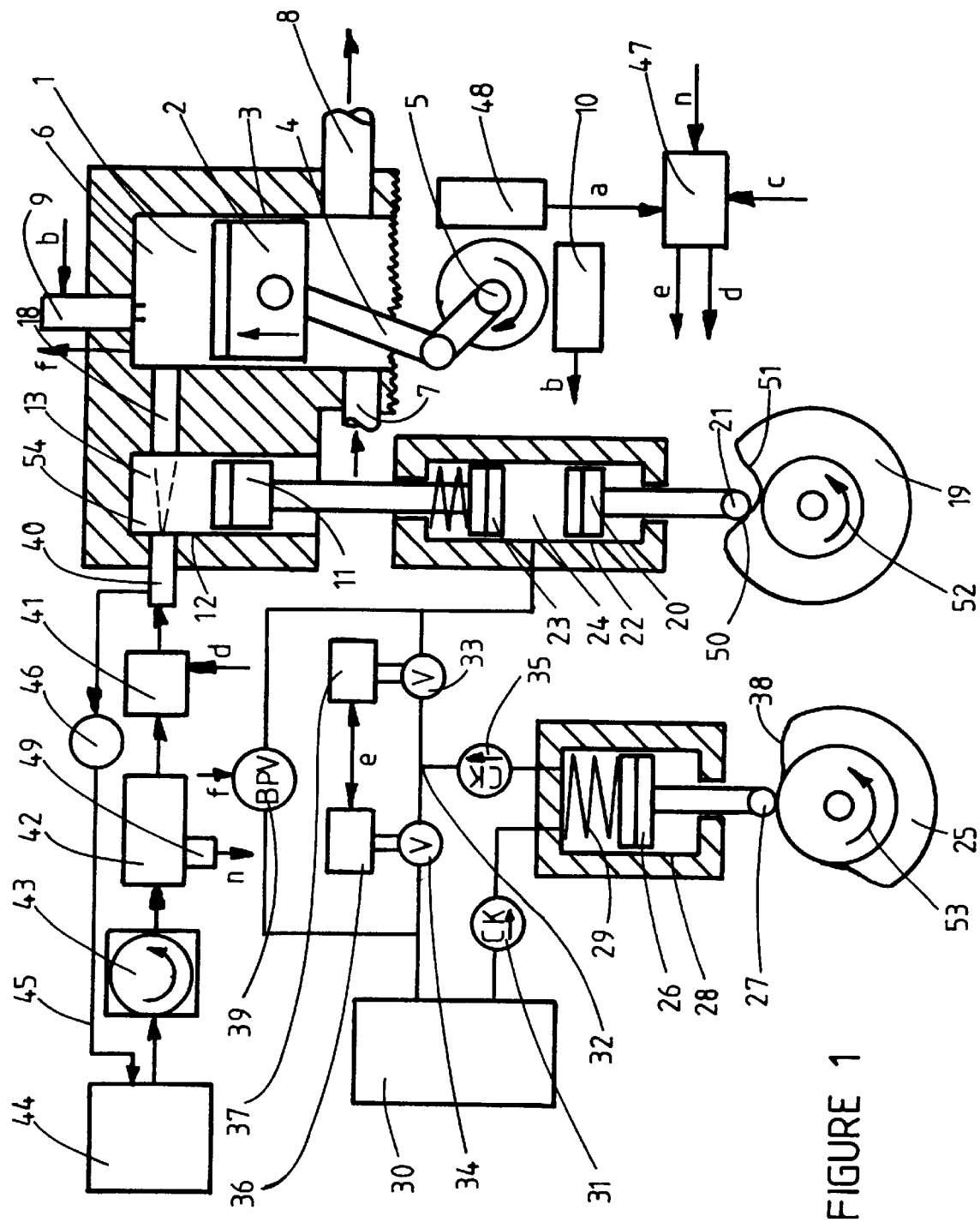
Figure 7:
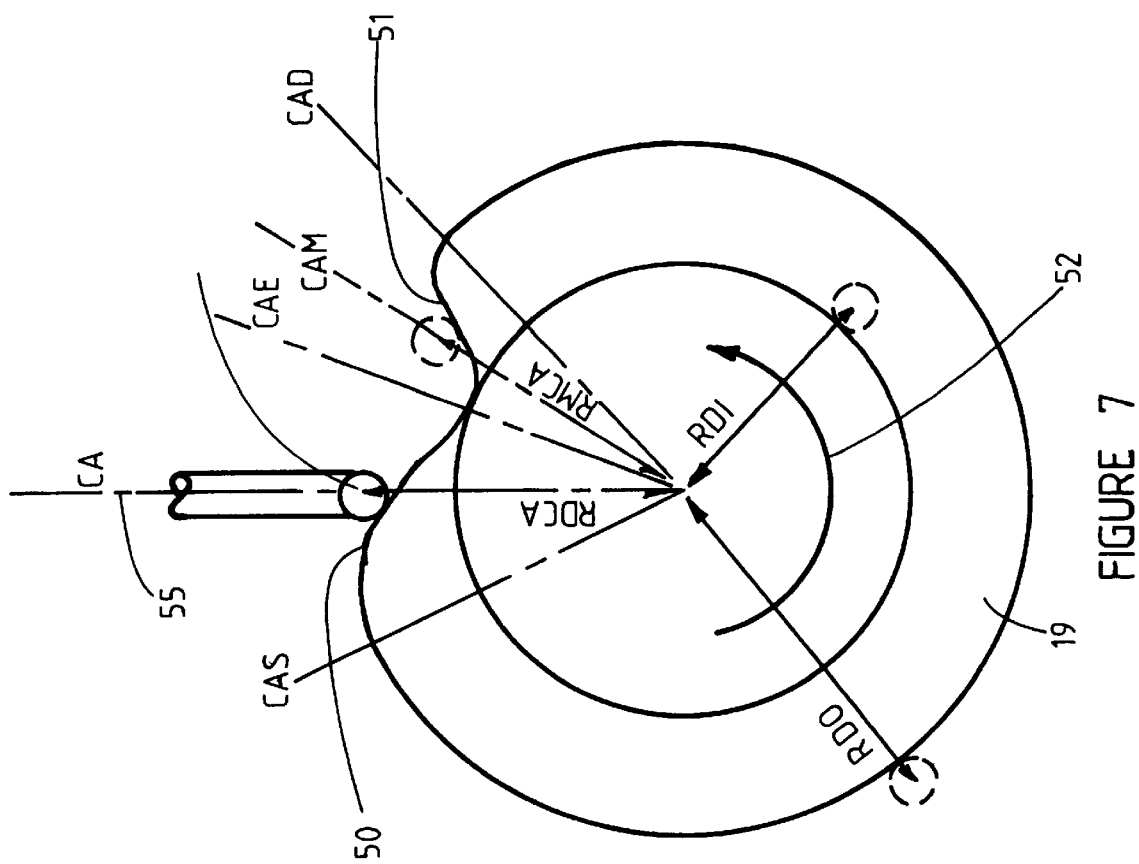
Figure 8:
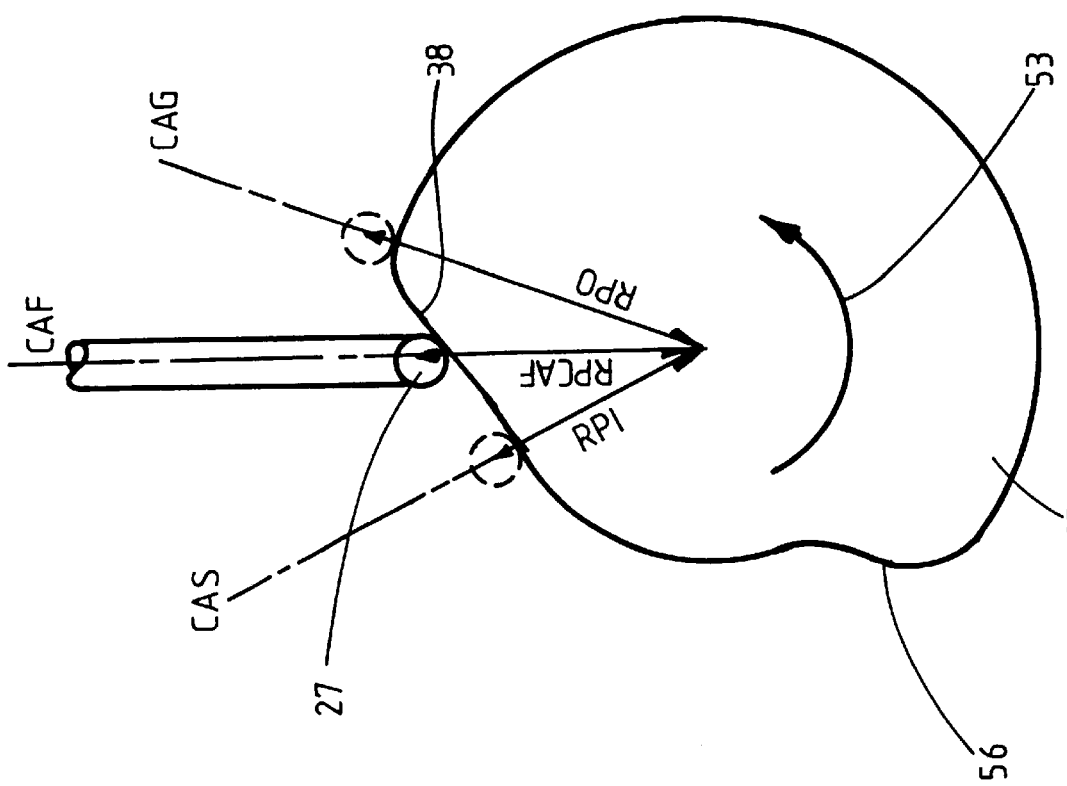

Details of the two cams of the FIG. 1 example form of the invention are shown schematically in FIG. 7 and FIG. 8.

Figure 2:
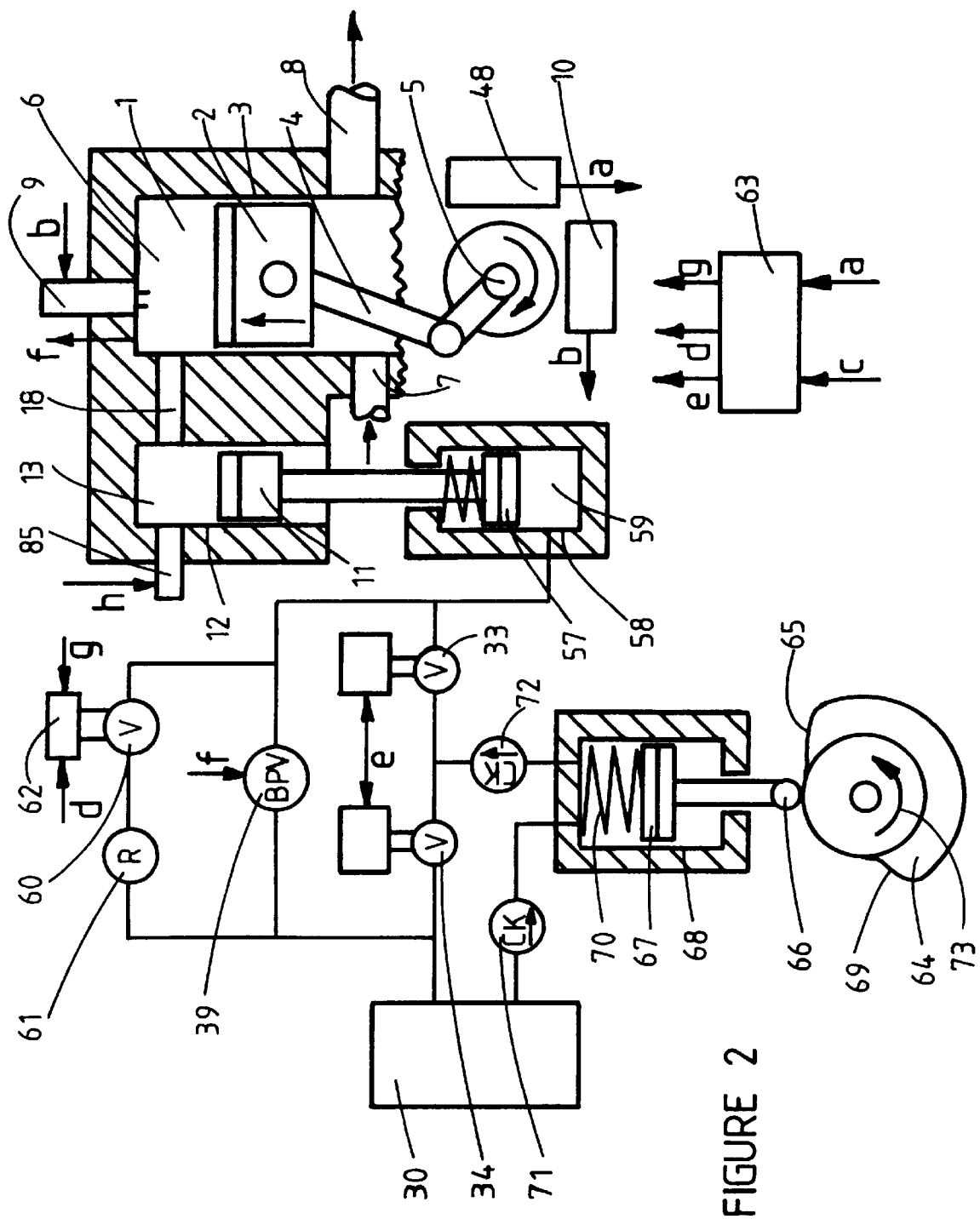
Figure 9:
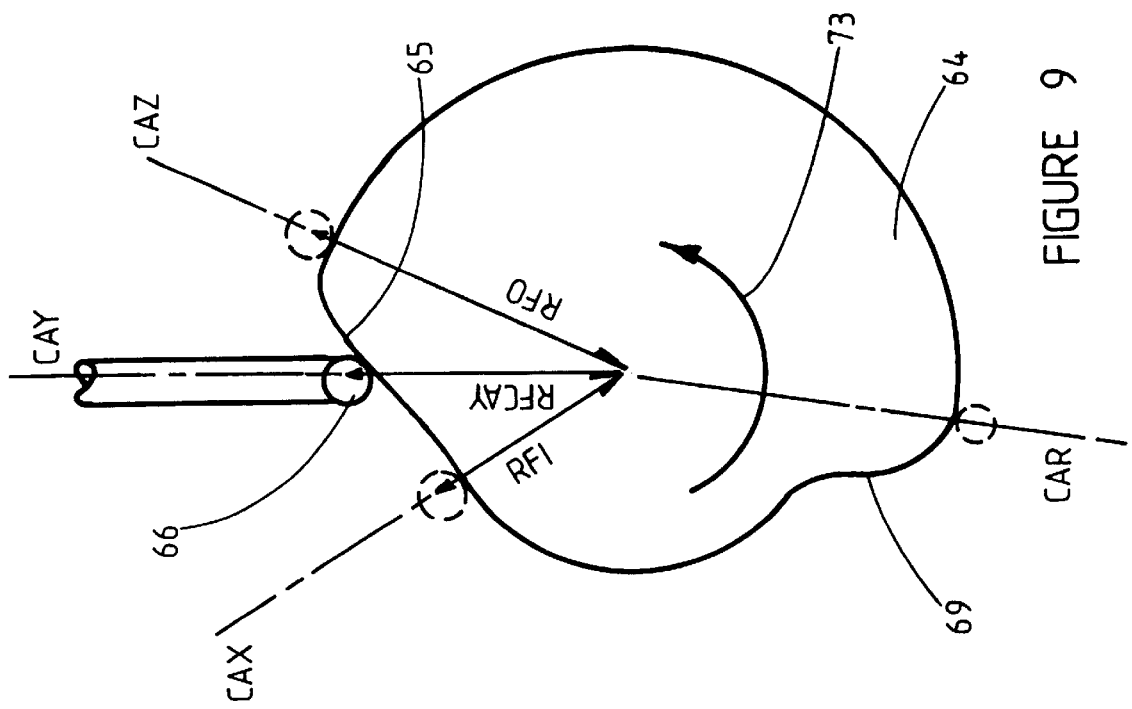

Details of the delivery pump cam of the FIG. 2 form of the invention are shown schematically in FIG. 9.

Figure 10:
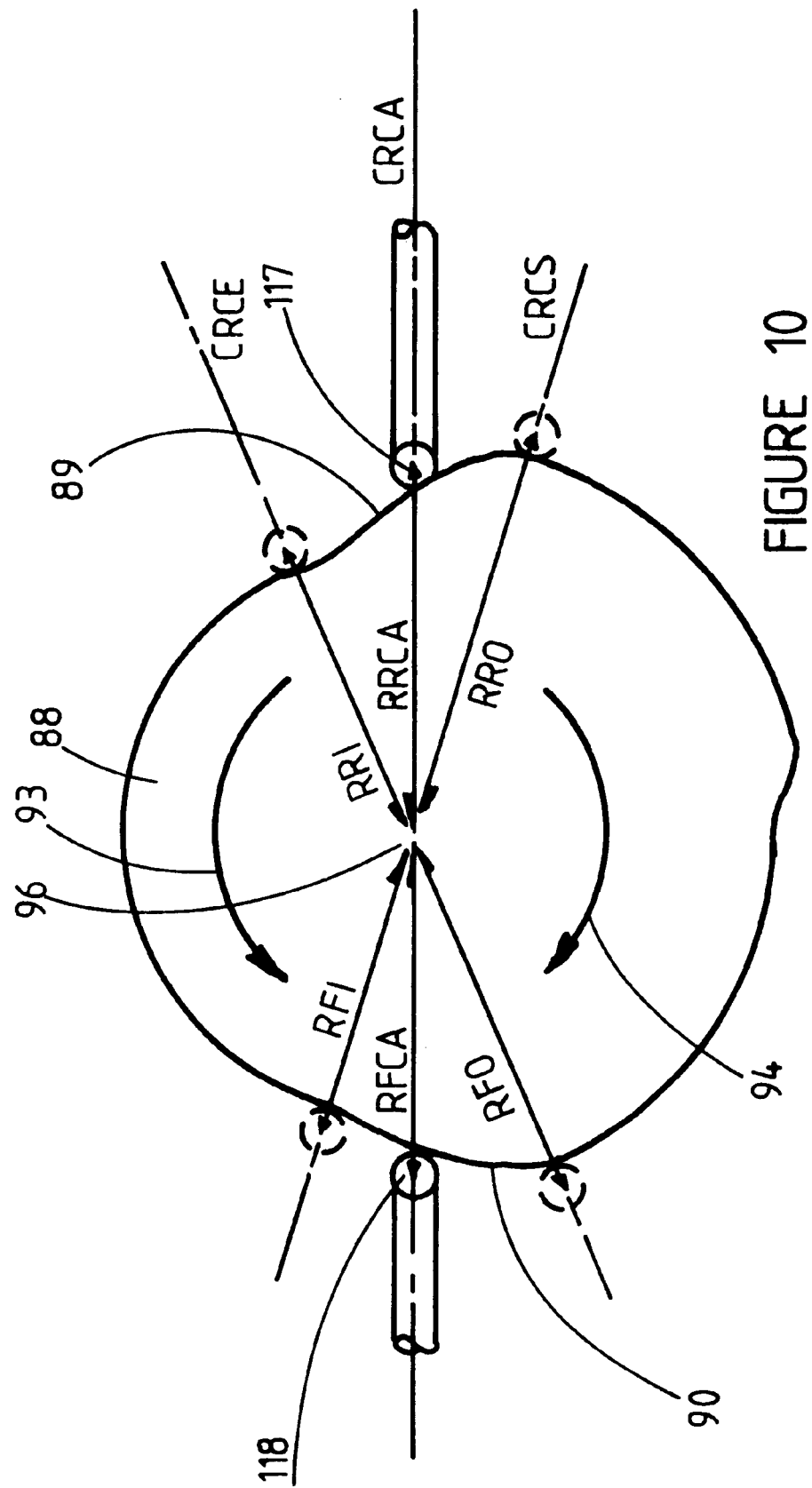
Figure 11:
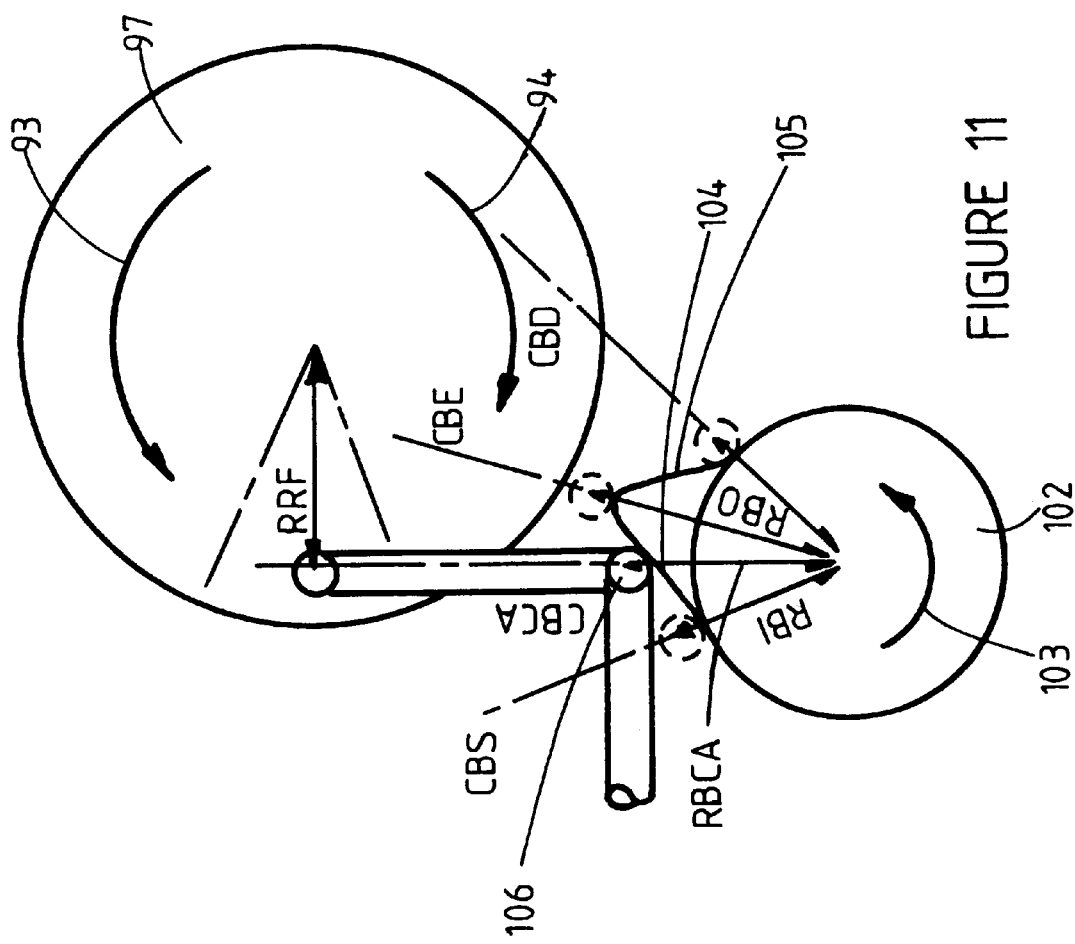

Details of the dual cams for the FIG. 4A, 4B and FIG. 4C example form of the invention are shown schematically in FIG. 10 and FIG. 11.

DESCRIPTION OF THE PREFERRED EMBODIMENTS

My following issued U.S. Patents describe stratifier apparatus and processes for creating a stratified fuel and air mixture in the variable volume chamber of a piston internal combustion engine:

A. "Air Fuel Vapor Stratifier", U.S. Pat. No. 5,899,188, issued May 4, 1999.
B. "Stratifier Apparatus for Engines", U.S. Pat. No. 5,899,195, issued May 4, 1999.
C. "Combustion Process for Compression Ignition Engines", U.S. Pat. No. 5,967,100, issued Oct. 19, 1999.

This stratifier apparatus for engines can be briefly described as follows: Each cylinder of an engine is fitted with at least one stratifier apparatus for engines and each such stratifier apparatus comprises the following elements:

1. A displacer comprising a displacer piston, sealably operative within a displacer cylinder, and these enclosing a displacer volume, within which an air fuel mixture can be created and contained;
2. One or more exit flow connections connect separately from the displacer volume into the combustion chamber portion of the variable volume chamber;
3. A driver and driver timer for driving the displacer piston into the displacer volume functions to displace the air fuel mixture out of the displacer volume, and into the variable volume chamber, during the combustion time interval, and via the exit flow passages. Preferably the driver holds the displacer piston inside the displacer volume throughout the expansion time interval to prevent hot burned gas backflow into the displacer volume;
4. A retractor and retractor timer retracts the displacer piston out of the displacer volume, during a portion of the exhaust, intake, and compression time intervals, which follow the expansion time interval. The displacer volume is then available to contain the air fuel vapor mixture for the next following engine cycle;
5. A mixture generator is used to create an air fuel vapor mixture within the displacer volume, prior to each combustion time interval. This air fuel vapor mixture can be created by injecting a fuel quantity from a source, into the displacer volume, while the displacer piston is retracting during the compression time interval. This retraction during compression can supply the air quantity from the variable volume chamber, via the open exit flow passages.

The Cummins diesel engine fuel injector, of the unit injector type, as described in the reference, "Internal Combustion Engines," L. C. Lichty, 6$^{th}$ Ed., 1951, McGraw Hill, page 261, FIG. 184, uses a displacer piston and displacer volume to inject a mixture of air and diesel fuel into the variable volume chamber of a diesel engine, via several exit flow passages. This Cummins fuel injector thus comprises essentially the elements listed above as items 1 through 5. This Cummins injector uses a fixed displacer volume, and thus the air quantity inside the displacer volume is fixed and very small. In consequence the displacer mixture is exceedingly fuel rich, resulting in the formation of appreciable soot during combustion.

The stratifier apparatus for engines additionally comprises one or more of the following elements:

6. Displacer Volume Adjuster:
   A displacer volume adjustor is used to adjust the displacer volume and hence the volume of the air fuel vapor mixture, while the engine is running. An engine fuel quantity adjustor is also used to adjust the fuel quantity per engine cycle in each displacer air fuel mixture, created within the displacer volume, in order to adjust engine torque output;
   In many engine applications, it will be preferred to adjust displacer volume in relation to fuel quantity so that the air quantity in each air fuel mixture inside the displacer volume is proportioned to the fuel quantity. In this way the air to fuel ratio of the displacer mixture can be kept approximately constant within desired limits. Alternatively the air fuel ratio of the displacer mixture can be varied as desired.
7. Ignition Methods:
   A stratifier apparatus for engines of this invention, as described above, will inject an air fuel mixture into the combustion chamber end of the engine variable volume chamber, during the latter part of the compression time interval. This injected air fuel mixture will then mix with, and interdiffuse with, the other gases such as air, in the variable volume chamber. To start the burning of this resulting stratified air fuel mixture in the variable volume chamber, various types of ignition can be utilized, alone or in combination, such as electric sparks, glow plugs, and compression ignition.
8. Pressure Compensator:
   A pressure compensator piston, freely and sealably operative within a pressure compensator cylinder, can be used in those engine applications where a minimum interruption of the burning process is desired. One side of the piston and end of the cylinder is connected to the variable volume chamber, and the other side is connected to the displacer volume. When burning commences in the variable volume chamber, the consequent rapid rise of pressure therein is transmitted, by the pressure compensator piston, into a corresponding pressure rise in the displacer volume. In this way the flow of displacer air fuel mixture into the variable volume chamber, and hence the burning process therein, remains largely continuous and uninterrupted, when the displacer piston is still moving into the displacer volume during the combustion time interval.
9. By using several separate exit flow passages the injected air fuel mixture can be directed into almost all portions of the air mass inside the variable volume chamber. Thus at maximum torque output, almost all of the air mass in the variable volume chamber can be utilized for burning.
   By using several separate exit flow passages, equipped with an exit valve and valve driver to open and close the exit passage, the number of exit flow passages, and hence the number of jets of air fuel vapor mixture injected into the variable volume chamber, can be reduced as engine torque is reduced. Correspondingly the volume of the displacer volume is reduced in order to maintain a fuel rich mixture therein;
   Details of these stratifier apparatus for engines are presented in the patent references listed hereinabove, and this material is incorporated herein by reference thereto.
   The invention to be described herein replaces the stratifier apparatus for engines, described in my U.S. Pat. Nos. 5,899,195, and 5,899,188, with a fuel in air mixer and proportioner. The fuel in air mixer and proportioner of this invention comprises several of the same elements as a stratifier apparatus for engines, and is an improvement over this earlier invention. When a fuel in air mixer and proportioner is substituted for a stratifier apparatus for engines, displacer fuel air mixtures can be used which are appreciably fuel leaner, and which, in consequence, create less exhaust smoke and odor, while retaining the antiknock and improved efficiency characteristics of the earlier invention.

Cam Plus Hydraulic Adjuster Example

An example fuel air mixer and proportioner apparatus of this invention, using a cam plus hydraulic adjuster displacer piston driver, in combination with a common rail fuel injector, is shown schematically in FIG. 1, and comprises the following:

A. The two stroke cycle single cylinder engine comprises the following elements as described hereinabove:
1. The variable volume chamber, 1, is enclosed by the piston, 2, and cylinder, 3. The piston, 1, is reciprocated by action of the internal combustion engine mechanism comprising a connecting rod, 4, and crank and crankshaft, 5. This piston motion creates a cycle of variation of the volume of the variable volume chamber, 1. When the piston is at top dead center, this minimum volume of the variable volume defines the combustion chamber end, 6, of this engine.
2. The two stroke cycle engine of FIG. 1 comprises an intake port, 7, through which air for combustion is supplied into the variable volume chamber during an intake time interval when the piston, 2, has uncovered the intake port, 7.
3. The engine of FIG. 1 further comprises an exhaust port, 8, through which burned gases leave the variable volume chamber during an exhaust time interval when the piston, 2, first uncovers the exhaust port, 8;
4. On the piston upstroke, the air inside the variable volume, 1, is compressed, after the intake port, 7, and exhaust port, 8, are covered by the piston, 2, during a compression time interval;
5. On the next piston downstroke, the burned gases inside the variable volume, 1, are expanded, during an expansion time interval, which ends when the exhaust port, 8, is uncovered by the piston, 2, to commence the next exhaust time interval;
6. Whenever fuel from any source and air are both present within the variable volume chamber, combustion can take place during such a potential combustion time interval. The actual combustion time interval commences when this fuel air mixture is ignited, as by a spark at spark electrodes 9, energized from a spark energizer and timer, 10. For reasons of engine cycle efficiency the combustion time interval preferably commences during the latter portions of the compression time interval and ends during the early portions of the expansion time intervals, and the spark energizer, 10, is timed accordingly;
7. A two stroke cycle engine is shown schematically in FIG. 1, but the stratifier apparatus for engines of this invention can also be used on four stroke cycle engines, and other equivalents, such as the Wankel engine;

Cam Plus Hydraulic Adjuster Example

For this invention, each engine cylinder is equipped with at least one fuel air mixer and proportioner apparatus, connecting into the combustion chamber end, 6, of the variable volume chamber, 1. The example form of the invention shown schematically in FIG. 1 comprises the following:
1. The displacer piston, 11, operates sealably within the displacer cylinder, 12, and these enclose the displacer volume, 13;
2. The flow passage, 18, connects the displacer volume, 13, to the combustion chamber end, 6, of the variable volume chamber, 1;

3. The combination displacer piston retraction and fuel injector apparatus, shown in FIG. 1, utilizes a cam plus hydraulic adjustor scheme to operate the displacer piston, in combination with a common rail system for injecting fuel into the displacer volume and comprises the following:
   a. A rotary displacer drive cam, 19, actuates the cam piston, 20, via the cam follower, 21. The cam piston, 20, operates sealably within the hydraulic adjustor cylinder, 22, within which the displacer drive piston, 23, operates sealably. The hydraulic adjustor volume, 24, between the cam piston, 20, and the displacer drive piston, 23, is filled with a liquid hydraulic fluid.
   b. A rotary delivery drive cam, 25, actuates the delivery piston, 26, via the cam follower, 27. The delivery piston, 26, operates sealably within the hydraulic delivery cylinder, 28. The delivery return spring, 29, acts to keep the cam follower, 27, on the delivery drive cam, 25.
   c. Reciprocation of the delivery piston, 26, by rotation of the delivery drive cam, 25, causes liquid hydraulic fluid to be pumped from the hydraulic fluid reservoir, 30, via the check valve, 31, to the inlet, 32, of the delivery valve, 33, and the bypass valve, 34, via the check valve, 35.
   d. The delivery valve, 33, and the bypass valve, 34, are opened and closed in tandem by their respective valve actuators, 36, 37, so that when the delivery valve, 33, is open, the bypass valve, 34, is closed, and vice-versa.
   e. When the delivery valve, 33, is open, hydraulic fluid will be pumped by the delivery piston, 26, into the hydraulic adjustor volume, 24, when the cam follower, 27, is on the delivery portion, 38, of the delivery drive cam, 25, and the distance between the cam piston, 20, and the displacer drive piston, 23, is thus increased.
   f. When the bypass valve, 34, is open, hydraulic fluid will be pumped back into the reservoir, 30.
   g. The back pressure valve, 39, bypasses hydraulic fluid from the hydraulic adjustor volume, 24, into the hydraulic fluid reservoir, 30, whenever fluid is being pumped into the adjustor volume, 24, and the displacer piston, 11, is fully driven into the displacer volume, 13. The back pressure valve, 39, is thusly opened only when fluid pressure in the hydraulic adjustor volume, 24, appreciably exceeds the product of engine combustion chamber pressure times the ratio of displacer piston area over displacer drive piston area. This opening pressure of the back pressure valve, 39, is set by the pressure connection, f, from the engine combustion chamber, 6, to the back pressure valve, 39.
   h. The rotary displacer drive cam, 19, is rotated at crankshaft speed in the direction, 52, for the two stroke cycle engine of FIG. 1. The rotary displacer cam, 19, is timed, relative to the engine cycle, so that the cam follower, 21, starts to follow the retraction portion, 50, of the cam, 19, preferably during the last half of the compression time interval, and reaches the end of this retraction portion, 50, prior to the end of the compression time interval. The cam follower, 21, then starts to follow the delivery portion, 51, of the cam, 19, prior to the end of the compression time interval, and reaches the end of this delivery portion, 51, at the latest, early during the following expansion time interval. As a result, the cam piston, 21, and the hydraulically connected displacer drive piston, 23, and the mechanically connected displacer piston, 11, are forced by engine cylinder pressure acting to retract the displacer piston to create a displacer volume, 13, during the latter portions of the compression time interval, and to then drive the displacer piston, 11, back into the displacer volume, 13, during the last portions of that compression time interval, whenever the delivery valve, 33, is closed. In this way engine air is transferred from the variable volume chamber, 1, into the displacer volume, 13, via the flow passage, 18, during the latter portions of the compression time interval. This transferred air, together with fuel injected thereinto, is then delivered back into the engine combustion chamber, 6, during the last portions of that same compression time interval and early portions of the next expansion time interval.

i. The rotary delivery drive cam, 25, is rotated at crankshaft speed in the direction, 53, for the two stroke cycle engine of FIG. 1. The rotary delivery cam, 25, is timed, relative to the engine cycle, so that the cam follower, 27, starts to follow the delivery portion, 38, of this cam at the same time that the displacer piston, 11, commences to retract to create a displacer volume, 13, and reaches the end of this delivery portion, 38, at the same time that the displacer piston, 11, would be fully driven back into the displacer volume, 13, by the delivery portion, 51, of the displacer drive cam, 19.

The volumetric rate of displacement of hydraulic fluid by the delivery piston, 26, when on the delivery portion, 38, of the delivery cam, 25, exceeds the volumetric rate of retraction of the cam piston, 20, when on the retraction portion, 50, of the displacer drive cam, 19. Additionally the total displacement of the delivery piston, 26, exceeds the total displacement of the cam piston, 20. As a result, retraction motion of the displacer drive piston, 23, and hence also of the displacer piston, 11, is stopped whenever the delivery valve, 33, is opened with the bypass valve, 34, closed, and the displacer piston, 11, is then driven back into the displacer volume, 13, by action of the displacement of fluid by the delivery piston, 26. In this way the volume of the displacer volume, 13, can be adjusted as follows:

(i) When delivery valve, 33, is open with bypass valve, 34, closed from the start of displacer piston, 11, retraction, no retraction occurs, and no delivery occurs, and no air mass is transferred from the variable volume chamber via flow passage, 18. This setting of valves, 33, 34, is used to stop the engine, and no fuel is injected, since no displacer volume is created.

(ii) When delivery valve, 33, is closed with bypass valve, 34, open, throughout the retraction and delivery motions of the displacer piston, 11, maximum retraction occurs and maximum available displacer volume is created. This setting of valves, 33, 34, is used at maximum engine torque output and maximum fuel mass per cycle is injected into this maximum displacer volume.

(iii) For engine torque output less than maximum, the delivery valve, 33, is opened, and the bypass valve, 34, is closed, when the displacer piston, 11, has moved only part way toward maximum retraction, and this valve setting stops displacer piston retraction. Displacer volume can thus be adjusted by timing the opening of valve, 33, and closing of valve, 34, relative to the extent of retraction of the displacer piston.

(iv) The excess fluid pumped into the adjustor volume, 24, by the delivery piston, 26, at engine torque output less than maximum, is returned to the fluid reservoir, 30, via the back pressure valve, 39, after the displacer piston has been fully driven into the displacer volume, 13.

j. The common rail liquid fuel injector of FIG. 1 comprises; a fuel injector valve, 40, connected via an injector control valve, 41, to the common rail, 42, into which the engine driven fuel pump, 43, pumps fuel from a fuel source, 44, at a rate well in excess of the fuel flow to the engine, this excess fuel returning to the fuel source, 44, via the passage, 45, with flow restriction, 46. The flow restriction, 46, is sized relative to the fuel pump, 43, so that the fuel pressure in the common rail, 42, is adequately in excess of the engine cylinder pressure to assure the desired degree of atomization when the liquid fuel is injected into the displacer volume, 13, via the injector valve, 40.

k. The controller, 47, is responsive to a crankshaft timing sensor, 48, via input, a, a common rail fuel pressure sensor, 49, via input, n, and an engine torque controller via input, c. The controller, 47, is operative upon the injector control valve, 41, via output, d, and upon the delivery valve, 33, and the bypass valve, 34, via ouput, e, so that:

(i) When displacer piston retraction commences, fuel injection also commences, by opening the injector control valve, 41 into the air mass flowing into the thusly created displacer volume, fuel is concurrently injected and admixed with the flowing air in the mixer region, 54, of the displacer volume.

(ii) Fuel injection is stopped when the fuel quantity required for desired engine torque has been injected by closing the injector control valve, 41, and concurrently opening delivery valve, 33, and closing bypass valve, 34. Displacer piston retraction is thus also stopped, and delivery of the mixture of fuel and air inside the displacer volume into the variable volume chamber is then started at the same time that fuel injection is stopped.

(iv) In this way, each fuel mass portion is injected into, and admixed with, each air mass portion being transferred from the variable volume chamber into the displacer volume during displacer piston retraction.

l. The ratio of total air mass, transferred from the variable volume chamber into the displacer volume during displacer piston retraction to the total fuel mass concurrently injected into this total air mass during each engine cycle, is the overall displacer mixture air to fuel mass ratio. Each air mass portion is admixed with a fuel mass portion as these portions enter the mixer region, 54, of the displacer volume, 13, and the air to fuel mass ratio of any one of these portions may differ from the overall displacer mixture air to fuel mass ratio. If some portions are fuel leaner than the overall ratio, other portions are correspondingly fuel richer than the overall ratio. For each such portion, the air to fuel mass ratio equals the ratio of the instantaneous air mass flow rate into the displacer volume to the instantaneous fuel mass flow rate into the displacer volume, while that portion is being admixed and formed. For example, if both the instantaneous air mass flow rate and the instantaneous fuel mass flow rate are constant throughout displacer piston retraction, all portions will have the same mixture ratio which will equal the overall mixture ratio, and this is the constant mixture ratio case. For some forms of this invention, and for some engine operating conditions, a variation of mixture ratio between different portions of each displacer mixture can be used to achieve additional beneficial objects, as will be described hereinafter. Such a variation of mixture ratio between displacer mixture portions can be obtained by varying the ratio of instantaneous air mass flow rate to instantaneous fuel mass injection rate during each displacer piston retraction.

Hydraulic Bleed and Delivery Pump Example

Figure 3:
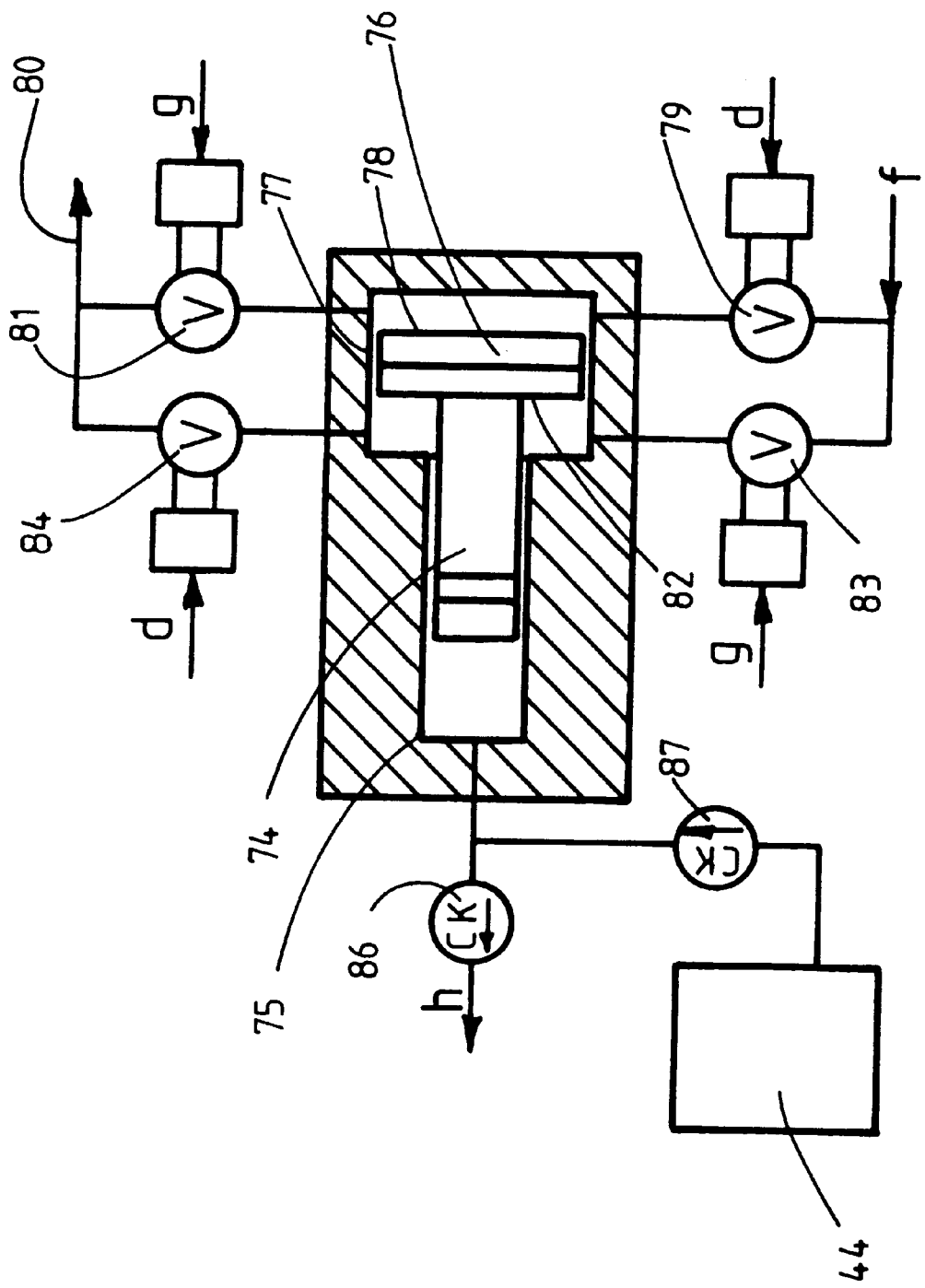

Another example form of the invention is shown schematically in FIG. 2, FIG. 3, and FIG. 9. The displacer piston hydraulic bleed and delivery pump drive scheme is shown in FIG. 2, to be used in combination with the engine cylinder pressure driven fuel injector shown in FIG. 3.

1. The displacer piston, 11, displacer cylinder, 12, displacer volume, 13, flow passage, 18, are similar to, and operate similarly to these elements as described hereinabove for the FIG. 1 form of the invention;

2. The hydraulic bleed and delivery pump drive scheme for retracting and driving the displacer piston, 11, comprises the following:

a. The displacer drive piston, 57, connected to the displacer piston, 11, operates sealably within the hydraulic bleed cylinder, 58, and these enclose a hydraulic bleed volume, 59, filled with liquid hydraulic fluid;

b. The bleed volume, 59, connects to a bleed valve, 60, in series with a bleed flow restriction, 61, so that when bleed valve, 60, is opened by its actuator, 62, hydraulic fluid can bleed from the bleed volume, 59, into the hydraulic fluid reservoir, 30, via the bleed flow restriction, 61;

c. During each compression time interval, engine cylinder pressure, in variable volume chamber, 1, acts on displacer piston, 11, and displacer drive piston, 57, to force hydraulic fluid out of bleed volume, 59, into hydraulic fluid reservoir 30, via bleed flow restriction, 61, and thus to cause retraction of displacer piston, 11, and creation and enlargement of displacer volume, 13, whenever bleed valve, 60, is opened by its actuator, 62. The time rate of increase of displacer volume, 13, depends upon the flow area of the bleed flow restriction, 61. This retraction of displacer piston, 11, is timed to commence during the latter portions of the compression time interval by the controller, 63, in response to inputs, a, from the engine crank angle sensor, 48, and c, from the engine torque control, operating via outputs, d, and g, upon actuator, 62, to open and close bleed valve, 60;

d. The delivery pump driver for driving the displacer piston, 11, back into the displacer volume, 13, in order to deliver the displacer mixture into the engine combustion chamber, 6, comprises: the rotary delivery cam, 64, rotating in direction, 73, whose delivery portion, 65, acts on delivery cam follower, 66, moving delivery pump piston, 67, to pump hydraulic fluid into the bleed volume, 59, when delivery valve, 33, is open, bypass valve, 34, is closed and bleed valve, 60, is closed. Delivery pump piston, 67, is sealably operative within delivery pump cylinder, 68. In this way retraction of displacer piston, 11, can be stopped, by closure of bleed valve, 60, and delivery motion of displacer piston concurrently commenced by closure of bypass valve, 34, and opening of delivery valve, 33. This delivery of displacer mixture into the engine combustion chamber is timed by rotary delivery cam, 64, and controller, 63, to commence prior to the end of the compression time interval;

e. Delivery pump piston, 67, is retracted for refilling with hydraulic fluid, from hydraulic fluid reservoir 30, by action of the refill portion, 69, of the rotary delivery cam, 64, and return spring, 70, and pump check valves, 71, 72, during the engine exhaust and intake time interval;

f. The controller, 63, responds to input, a, from the engine crank angle sensor, 48, and input, c, from the engine torque control, and operates upon delivery valve, 33, and bypass valve, 34, via output, e, and upon bleed valve, 60, via actuator, 62, via outputs, d and g, as follows:

(i) when the engine is to be stopped, bleed valve, 60, remains closed, and delivery valve, 33, remains closed and bypass valve, 34, is opened when rotary delivery cam, 64, delivery portion, 65, commences pumping hydraulic fluid. The displacer piston, 11, is not retracted for engine stopping;

(ii) At maximum engine torque, bleed valve, 60, is opened before delivery cam delivery portion, 65, commences pumping, and with delivery valve, 33, closed and bypass valve, 34, open. Maximum retraction of the displacer piston, 11, occurs, creating maximum displacer volume, 13. When delivery portion, 65, subsequently commences pumping, by closing of bleed valve, 60, and closing of bypass valve, 34, and opening of delivery valve, 33, the maximum displacer mixture is delivered into the engine combustion chamber, 6, by driving the displacer piston, 11, into the displacer volume, 13;

(iii) At partial engine torque, bleed valve, 60, is opened before delivery cam delivery portion, 65, commences pumping, but later than for maximum engine torque, and with delivery valve, 33, closed, and bypass valve, 34, open. Partial retraction of the displacer piston, 11, occurs, until displacer mixture delivery commences, when delivery portion, 65, subsequently commences pumping, with bleed valve, 60, and bypass valve, 34, closed, and delivery valve, 33, open. The extent of retraction of displacer piston, 11, and thus the displacer volume, 13, created is thus controlled by the controller, 63, by control of the crank angle interval between commencement of retraction of displacer piston and commencement of delivery of displacer mixture. Since commencement of delivery is fixed by the position of the delivery portion, 65, of the delivery cam, 64, commencement of displacer piston retraction starts earlier, during the compression time interval, as engine torque is increased.

g. The engine cylinder pressure driven fuel injector for injecting fuel into the displacer volume, 13, in combination with and concurrently with the retraction of displacer piston, 11, comprises the following:

(i) The fuel injector plunger, 74, operates sealably within the fuel injector barrel, 75, and connects to the injector drive piston, 76, which operates sealably within the drive cylinder, 77. The area of the drive piston, 76, is greater than the area of the fuel injector plunger, 74.

(ii) The drive side, 78, of drive piston, 76, connects to engine cylinder pressure source, f, via drive valve, 79, and to vent source, 80, via drive vent valve, 81. The refill side, 82, of drive piston, 76, connects to engine cylinder pressure source, f, via refill valve, 83, and to vent source, 80, via refill vent valve, 84.

(iii) By closing valves 83 and 81, while opening valves 84 and 79, the plunger, 74, will be forced by engine cylinder pressure to inject fuel into the displacer volume, 13, via connection, h, check valve, 86, and fuel injector, 85;

(iv) By closing valves 79 and 84, while opening valves 83 and 81, the plunger, 74, will be retracted by engine cylinder pressure to refill the barrel, 75, with fuel from the fuel source, 44, via check valve, 87;

(v) The controller, 63, responsive to engine crank angle input, a, and engine torque input, c, operates upon drive valve, 79, drive vent valve, 81, refill valve, 83, and refill vent valve, 84, via outputs, d and g, as follows:

(1) When the engine is to be stopped, valves 79 and 84 remain closed and valves 81 and 83 can be opened. Hence no fuel is injected into the displacer volume;

(2) At maximum and intermediate engine torque, valve 79 and valve 84 are opened, valve 81 and valve 83 are closed, concurrently with commencement of retraction of displacer piston, 11, by opening of bleed valve, 60. When delivery portion, 65, of delivery cam, 64, commences pumping and thus ends displacer piston retraction, valve 79 and valve 84 are closed and valve 81 and valve 83 can then be opened, thus ending fuel injection concurrently with the end of displacer piston retraction. Refill of the injector barrel, 75, can then take place after the ending of fuel injection;

(vi) The displacement of the delivery pump piston, 67, exceeds the maximum displacement of the displacer drive piston, 57, so that the displacer piston, 11, can always be driven fully into the displacer volume, 13, during each delivery of the displacer mixture into the engine combustion chamber, 6. The excess hydraulic fluid thusly pumped by piston, 67, is returned to the hydraulic fluid reservoir, 30, via the back pressure valve, 39, as described hereinabove for the FIG. 1 form of the invention. The suction portion, 69, of the rotary delivery cam, 64, and the delivery return spring, 70, return the delivery piston, 67, to the starting position during the engine exhaust and intake time interval, and the delivery pump is refilled with hydraulic fluid from the fluid reservoir, 30, via check valve, 71.

Dual Cams and Phase Changer Example

A mechanical example form of driver for the displacer piston and the fuel injection pump is shown schematically in FIG. 4A, FIG. 4B and FIG. 4C and comprises:

1. As shown in FIG. 4C, a back and forth rocker cam, 88, drives the displacer piston, 11, via the retractor portion, 89, of this rocker cam. The injector portion, 90, of the rocker cam drives the plunger, 91, of the fuel injector pump, 92;

2. The displacer piston, 11, displacer volume, 13, flow passage, 18, variable volume chamber, 1, and engine piston, 2, are similar to and operate similarly to these elements as described hereinabove for the FIG. 1 form of the invention;

3. The rocker cam, 88, is driven back and forth in the retraction direction, 94, followed by the delivery direction, 93, through an angle of motion, 95, about the rotational center, 96. The motion angle, 95, equals the angular extent of the retractor portion, 89, and the injector portion, 90, of the rocker cam, 88.

4. As shown in FIG. 4B, the rocker plate, 97, drives the rocker cam, 88, via the helical splined phase changer coupling, 98, whose internal helical splined, phase changer sleeve, 99, is adjustable in the directions, 100, by the engine torque control lever, 101. Movement of the phase changer sleeve, 99, changes the angular relation of the rocker cam, 88, to the rocker plate, 97. Other types of phase changers could alternatively be used, such as epicyclic gear phase changers;

5. The rotary cam, 102, is rotated unidirectionally at engine crankshaft speed for a two stroke cycle engine, such as shown in FIG. 1, in the direction, 103. The retract portion, 104, of the rotary cam drives the rocker plate, 97, and coupled rocker cam, 88, in the retract and inject direction, 94. The deliver portion, 105, of the rotary cam, 102, drives the rocker plate, 97, and rocker cam, 88, in the mixture delivery direction, 93. The rotary cam, 102, thusly drives the rocker plate, 97, and rocker cam, 88, via the rotary cam follower, 106, connected at radius (RRF) to the rocker plate, 97. The spring, 107, and link, 108, act to hold the follower, 106, on the cam surfaces, 104, 105;

6. The rotary cam, 102, is timed relative to the engine crank, 5, so that the motion angle, 95, of the rocker cam, 88, moves the retractor portion, 89, and the injector portion, 90, fully past the displacer piston cam follower, 117, and the fuel injector cam follower, 18, when the phase changer sleeve, 99, is in the maximum engine torque setting. The rotary cam, 102, is also timed, relative to the engine crank, 5, so that the resulting displacer piston, 11, retraction and fuel injection occur concurrently during the latter portions of the engine compression time interval, and so that displacer piston delivery motion into the displacer volume, 13, commences prior to the end of the same engine compression time interval;

7. When the phase changer sleeve, 99, is adjusted by the engine torque control lever, 101, to the zero torque, engine stopping position, the rocker cam angle of motion, 95, does not move any portion of the retractor segment, 89, or the injector segment, 90, past the displacer piston cam follower, 117, or the fuel injector cam follower, 118.

At this setting the retractor and injector portions of the rocker cam do not act upon the displacer piston, 11, or the fuel injector plunger, 91, and neither displacer piston retraction, nor fuel injection take place, and thus the engine is stopped.

8. When the phase changer sleeve, 99, is adjusted to positions intermediate between the zero torque position and the maximum torque position, the rocker cam angle of motion, 95, moves only parts of the retractor segment, 89, and the injector segment, 90, past the respective cam followers, 117, 118.

At this setting of the sleeve, 99, partial retraction of the displacer piston, 11, occurs, and partial fuel injection by the fuel injector plunger, 91, occurs, and partial engine torque output results. In this way engine torque output can be adjusted, from zero torque to maximum torque, by adjustment of the phase changer sleeve, 99. Throughout this whole range of engine torque adjustment, displacer piston retraction and consequent air mass transfer into the displacer volume, 13, occurs concurrently with injection of fuel by the injector plunger, 91, also into the displacer volume via the fuel injector nozzle, 111, since the retractor portion, 89, and injector portion, 90, of the rocker cam, 88, have the same angular extent and phase relation, relative to their cam followers, 117, 118.

9. The fuel injector pump, 92, and plunger, 91, injects fuel via delivery check valve, 113, to the fuel injector nozzle, 111, via connection, h, when the plunger, 91, is moved in the direction, 114, by the injector portion, 90, of the rocker cam, 88, when rocking in the retract direction, 94. The fuel injector pump, 92, is refilled with fuel from the fuel source, 44, via the suction check valve, 112, when the plunger, 91, is moved opposite to the direction, 114, by the spring, 115, and injector portion, 90, of the rocker cam, 88, when rocking in the delivery direction, 93;

10. The displacer piston, 11, is always driven fully into the displacer volume, 13, by the retractor portion, 89, of the rocker cam, 88, in the mixture delivery direction, 116, when the rocker cam is rocking in the delivery direction, 93. In this way the displacer mixture is fully delivered into the combustion chamber portion, 6, of the variable volume chamber, 1, commencing immediately after completion of displacer piston retraction and fuel injection, and prior to the end of the engine compression time interval;

11. This FIG. 4A, 4B and 4C example, dual cams and phase changer form of displacer piston and fuel injector drive, thus carries out the same functions as the cam plus hydraulic adjustor drive example of FIG. 1, and also the hydraulic bleed and delivery pump example of FIG. 2 and 3. All of these forms of the invention function to create the displacer fuel air mixture inside the displacer volume, and then to deliver this displacer mixture into the engine combustion chamber, where combustion then takes place;

12. The dual cams and phase changer drive of FIG. 4A, 4B and 4C is wholly mechanical, and may be preferred for use on internal combustion engines operated at higher engine speeds, since it will not suffer increased friction power losses due to hydraulic fluid flow and throttling;

Sizing

1. Displacer mixture ratio and required displacer volume:

All portions of the displacer mixture are to be created fuel richer than the stoichiometric ratio for the fuel being used, and thus the overall displacer mixture air to fuel ratio (DAF), is also fuel richer than stoichiometric. Frequently all portions of the displacer mixture may preferably be created fuel richer than the flammable or spark ignitable limit, to avoid possible flame flashback into the displacer volume.

The overall displacer air to fuel mass ratio, (DAF), is a preselected design factor whose value depends upon the fuel being used and the compression ratio (CRO) of the engine, as follows:

a. A higher, leaner value of (DAF) can be used with gasoline or gas fuels of a higher octane number and with diesel fuels of a lower cetane number;

b. A lower, richer value of (DAF) will be used for higher engine compression ratio;

The maximum required displacer volume, (VACAE Max) can be estimated from the following dimensionless relation:

$$\frac{(VACAE \text{ Max})}{(VD)} = \frac{[B - \cos(CAE)]}{2} \frac{(DAF)(MFM)}{[(MAM) - (DAF)(MFM)]}$$

wherein:
(VD)=Engine displacement volume per cylinder;
(CA)=Engine crank angle during compression time interval, in radians;
(CAE)=Engine crank angle during the compression time interval when displacer piston retraction ends at maximum displacer-piston retraction;

$$(B) = \left[1 + \frac{2}{CRO - 1}\right]$$

(CRO)=Engine cylinder compression ratio;

$$(CRO) = \frac{(VD) + (VCL)}{(VCL)}$$

(VCL)=Engine cylinder clearance volume, with engine piston at top dead center, and (CA) equal to two pi radians on the compression stroke;
(MFM)=Maximum fuel mass per cycle at maximum engine torque;

$$(MFM) = \frac{(BHPM)}{(EI)(CPM)(LHV)(EM)} = \frac{(MAM)}{(EAFM)}$$

(BHPM)=Maximum design engine power output;
(CPM)=Engine cycles per unit of time;
(EI)=Engine indicated thermal efficiency, fractional;
(LHV)=Heating value of engine fuel;
(EM)=Engine mechanical efficiency, fractional;
(MAM)=Maximum total air mass per engine cycle;
(MAM)=(VD) (DAI) (EV)
(EAFM)=Maximum overall engine air to fuel mass ratio;
(EAFM)=(SAF) (ER)
(DAI)=Engine intake air density;
(EV)=Engine volumetric efficiency, fractional;
(SAF)=Stoichiometric air to fuel ratio for fuel being used;
(ER)=Mass equivalence ratio, usually somewhat greater than 1.0;

These relations are approximate, and include the assumption that air density in the displacer volume is very nearly equal to air density in the engine cylinder during the compression time interval. If air is transferred from the variable volume chamber into the displacer volume at high velocity, and hence with an appreciable pressure drop, different sizing relations will be needed. Additionally, it is assumed that all fuel is first injected into the displacer volume and enters the engine combustion chamber, subsequently, as part of the displacer mixture;

The preselected design value of overall displacer air to fuel ratio (DAF) depends also on engine speed and intake supercharge, as follows:

c. A higher, leaner (DAF) valve can be used at higher engine speed, since mixture residence time in the displacer volume is reduced;

d. A lower, richer (DAF) value will be needed at higher engine supercharge, since compression ignition time delay period is reduced as supercharge is increased;

In most cases, the leanest useable values of (DAF) will be preferred, in order to minimize soot formation and resultant exhaust smoke. Hence we may want to adjust (DAF) as engine speed and supercharge are varied. The manner of variation of (DAF) with engine speed and supercharge is best determined experimentally in an operating prototype engine. At each engine operating condition over the intended operating range of the engine (DAF) is increased to leaner ratios until the flammable limit is reached or until compression ignition occurs inside the displacer volume. Useable (DAF) values are then to be selected somewhat richer than these experimentally determined limiting values.

B. Instantaneous Mixture Ratios:

Each portion of the displacer mixture has an instantaneous air to fuel ratio (IAF) as it is being created in the mixer portion of the displacer volume, by injecting fuel into the air being transferred into this mixer:

$$(IAFn) = \frac{\text{Instantaneous air mass flow rate}}{\text{Instantaneous fuel mass flow rate}}$$

$$(IAFn) = \frac{(MARn)}{(MFRn)}$$

For the 'n' displacer mixture portion being created at engine crank angle, (CAn);

The instantaneous fuel mass flow rate (MFR) is determined by the rate of fuel injector plunger displacement, for a positive displacement fuel injector, or by the fuel flow rate through the injector nozzle holes, for a common rail fuel system, and these fuel mass flow rate relations are well known in the prior art.

The instantaneous air mass flow rate (MAR) is determined by a combination of the displacer piston retraction rate, the engine piston displacement rate, and the current existing displacer volume (VACA), whose density is being increased by the continued compression, and all of these vary during displacer piston retraction. The following approximate dimensionless equations relate these several variables to one another:

$$\frac{d(Z)}{d(CA)} = Q(z) + P(z)^2 \left(\frac{MAR}{MA}\right) \quad \text{Eqn. B1}$$

Wherein: $(z) = \left(\frac{VCA}{VD}\right)$ $$\frac{d(Z)}{d(CA)} = \frac{d\left(\frac{VCA}{VD}\right)}{d(CA)}$$

= Rate of change of total gas space volume, per crank angle;

(VCA)=Total gas space volume at engine crank angle, (CA);
(VCA)=(VACA)+(VDCA)
(VACA)=Instantaneous displacer volume at engine crank angle (CA);
(VDCA)=Engine cylinder volume at engine crank angle (CA);
(MA)=Total engine air mass per cycle;

$$Q = \frac{\sin(CA)}{[B - \cos(CA)]}$$

$$P = \frac{2}{[B - \cos(CA)]}$$

$$\left(\frac{VCA}{VD}\right) = \frac{(VACA)}{(VD)} + \frac{[B - \cos(CA)]}{2}$$

$$\frac{d\left(\frac{VACA}{VD}\right)}{d(CA)} = \text{Volumetric rate of retraction of} \quad \text{Equation B2}$$

displacer piston at engine crank angle (CA);

$$\frac{d\left(\frac{VACA}{VD}\right)}{d(CA)} = \frac{d\left(\frac{VCA}{VD}\right)}{d(CA)} - \frac{[\sin(CA)]}{2};$$

And this instantaneous volumetric rate of retraction of the displacer piston is required, in order to create the instantaneous mass rate of air flow (MAR) into the displacer volume (VACA). The displacer piston driver is thus to be designed to create this schedule of displacer piston retraction.

Solutions, in equation form, can be made of equation B1, for at least the following two special cases of preselected air mass flow rate (MAR):

Case A: $\left(\frac{MAR}{MA}\right)$ = A constant value during displacer piston retraction;

Case B: $\left(\frac{MAR}{MA}\right)$ Varies linearly with engine crank angle (CA) during Displacer piston retraction;

And these special case solutions can be used to design cam driven displacer piston drivers, such as those shown in FIG. 1, and in FIGS. 4A, 4B, and 4C, as will be described hereinbelow.

Alternatively, the displacer piston retraction rate can be preselected, and the resulting air mass flow rate determined via equation B2, followed by equation B1. This alternative solution method, Case C, can be used to design engine cylinder pressure driven displacer piston drivers, such as that shown in FIGS. 2 and 3, as will also be described hereinbelow.

Any consistent system of units can be used in these design equations.

These three cases, A, B and C, are examples, and other methods of determining the design relation of instantaneous air mass transfer rate (MAR) to displacer piston retraction rate can be used, including numerical methods and graphical methods.

C. Constant Air Mass Flow Rate, Case A:

This constant air mass flow rate, Case A, can be illustrated by the cam plus hydraulic adjustor, in combination with the common rail fuel injector, example form of the invention of FIG. 1 and FIG. 7:

For constant air mass transfer rate the solutions of equations B1 and B2 are as follows:

$$\left(\frac{VACA}{VD}\right) = \frac{[B-\cos(CA)]}{2}\left(\frac{MAR}{MA}\right)\frac{[(CA)-(CAS)]}{\left[1-\left(\frac{MAR}{MA}\right)[(CA)-(CAS)]\right]} \quad \text{Equation C1}$$

$$\frac{(VACA)}{(VACAE \text{ Max})} = \frac{[(RDO)-(RDCA)]}{[(RDO)-(RDI)]} \quad \text{Equation C2}$$

$$\frac{d\left(\frac{VACA}{VD}\right)}{d(CA)} = \frac{[B-\cos(CA)]}{2}(F1) + \frac{[\sin(CA)]}{2}(F2)$$

Wherein:

(CAS)=Engine crank angle during the compression time interval when displacer piston retraction starts, with displacer piston cam follower, 21, on cam, 19, at cam angle (CAS) of FIG. 7, for rotary displacer drive cam, 19, direction of rotation, 52, in radians;

(CA)=Engine crank angle during the compression time interval, measured from engine piston at bottom dead center, where (CA) equals pi radians (180 degrees) when centerline, 55, of displacer piston cam follower, 21, line of motion, coincides with cam angle (CA) of FIG. 7, for the two stroke cycle engine of FIG. 1, in radians;

(CAE)=Engine crank angle when displacer piston retraction ends for maximum displacer piston extent of retraction (RDO–RDI) in radians;

(RDO)=Outer radius of rotary displacer drive cam, 19, to center of roller cam follower, 21, in FIG. 7;

(RDI)=Innermost radius of rotary displacer drive cam, 19, to center of roller cam follower, 21, in FIG. 7;

(RDCA)=Radius of rotary displacer drive cam, 19, to center of roller cam follower, 21, at engine crank angle (CA);

(VACA)=Displacer volume during retraction at engine crank angle (CA);

(VACA)=(AD) (RDO–RDCA)

(AD)=Displacer piston area;

$$(F1) = \frac{\left(\frac{MAR}{MA}\right)}{\left[1-\left(\frac{MAR}{MA}\right)[(CA)-(CAS)]\right]^2}$$

$$(F2) = \frac{\left(\frac{MAR}{MA}\right)[(CA)-(CAS)]}{\left[1-\left(\frac{MAR}{MA}\right)[(CA)-(CAS)]\right]}$$

Equations C1 define the relation between rotary displacer drive cam, 19, cam radius, (RDCA), and engine crank angle (CA), for the retraction portion, 50, of this single cam drive. For the two stroke cycle engine of FIG. 1, cam angles equal crank angles. For four stroke cycle engines cam angles are one half of crank angles.

The various design factors are selected by the engine designer to suit the intended use of the engine. However, several such design factors are unique to engines equipped with fuel in air mixers and proportioners of this invention. For example, the engine crank angle for starting displacer piston retraction (CAS) and for ending displacer piston retraction (CAE), can be selected to satisfy the requirement that fuel air mixture ignition and burning are to take place only in the variable volume chamber and not inside the displacer volume. This requirement avoids excess heat loss to the engine cooling jacket and consequent loss of fuel efficiency. In many engine applications retraction of the displacer piston starts preferably during the last half of the compression time interval and ends prior to the end of the compression time interval in order to reduce the time available for occurrence of compression ignition. However, for fuels of low vapor pressure and low cetane number with a very long compression ignition time delay period, it may be preferred to start displacer piston retraction earlier in the compression time interval, in order to provide a longer time for increased fuel evaporation within the displacer volume.

The common rail fuel injector of FIG. 1 creates an approximately constant instantaneous fuel mass flow rate (MFM) during injection, since the common rail pressure is essentially constant, and much greater than the pressure and pressure variation in the displacer volume during injection. Thus, when used in combination with the constant air mass transfer rate of Case A, all portions of the displacer mixture will have essentially the same instantaneous mass ratio of air to fuel $$\frac{MAR}{MFR},$$

For the common rail fuel injector shown in FIG. 1, as engine RPM is increased, the fuel quantity pumped through a fixed area flow restriction, 46, increases in proportion to engine RPM. As a result the fuel injection pressure in the common rail, 42, increases in proportion to the square of engine RPM, and the fuel mass injection rate into the displacer volume, 13, increases linearly with engine RPM. Hence the angular duration of fuel injection for the same fuel quantity remains constant as engine RPM is varied. Since the rate of retraction of displacer piston, 11, by displacer drive cam, 19, also increases linearly with engine RPM, the displacer mixture ratio remains essentially constant, as engine RPM is varied, with this FIG. 1 form of the invention, using a common rail fuel injector in combination with a single cam plus hydraulic adjuster displacer piston drive.

D. Variable Air Mass Flow Rate, Case B:

This variable air mass flow rate, Case B, can be illustrated by the dual cams plus phase changer combination driver of both the displacer piston and the fuel injector positive displacement pump shown in the FIG. 4A, 4B, 10, and 11 example form of the invention.

For a linear variation of air mass transfer rate with engine crank angle, CA, the following relation can be assumed:

$$\left(\frac{MAR}{MA}\right) = a + b[(CA)-(CAS)]$$

-continued

Wherein:

$a$ = Minimum value of $\left(\dfrac{MAR}{MA}\right)$ for the first created portion of the displacer mixture;

$$b = \dfrac{\left(\dfrac{MAR}{MA}\text{Max}\right) - \left(\dfrac{MAR}{MA}\text{Min}\right)}{[(CAE)-(CAS)]}$$

$\left(\dfrac{MAR}{MA}\text{Max}\right)$ = Maximum value of $\left(\dfrac{MAR}{MA}\right)$ for the last created portion of the displacer mixture;

The resulting solutions of equations B1 and B2 are as follows:

$$\left(\dfrac{VACA}{VD}\right) = \dfrac{[B-\cos(CA)]}{2}\dfrac{F3}{[1-F3]} \quad \text{Equations D1}$$

$$\dfrac{(VACA)}{(VACAE\text{ Max})} = \dfrac{[(RRO)-(RRCA)]}{[(RRO)-(RRI)]}$$

$$\dfrac{(VACAE\text{ Max})}{(VD)} = \left(\dfrac{AD}{VD}\right)[(RRO)-(RRI)] \quad \text{Equation D2}$$

$$\dfrac{d\left(\dfrac{VACA}{VD}\right)}{d(CA)} = \dfrac{[B-\cos(CA)]}{2}(F4) + \dfrac{[\sin(CA)]}{2}(F5)$$

Wherein:

$$(F3) = a[(CA)-(CAS)] + \dfrac{b}{2}[(CA)-(CAS)]^2$$

$$(F4) = \dfrac{a + b[(CA)-(CAS)]}{[1-(F3)]^2} = \dfrac{\left(\dfrac{MAR}{MA}\right)}{[1-(F3)]^2}$$

$$(F5) = \dfrac{(F3)}{[1-(F3)]}$$

(RRO)=Rocker cam outer radius for the retractor portion, 89, of the rocker cam, 88, as shown in FIG. 10, to center of roller cam follower, 117;

(RRI)=Rocker cam inner radius for the retractor portion, 89, to center of roller cam follower, 117;

(RRCA)=Rocker cam radius to center of roller cam follower, 117, at engine crank angle (CA), as shown in FIG. 10;

Equations D1 define the relation between rocker cam, 88, cam radius (RRCA) and engine crank angle (CA) for the retraction portion, 89, of the rocker cam. The relation of rocker cam angles (CRC) to crank angles (CA) is set by the rotary cam, 102, action on the rocker plate, 97, as shown in FIG. 4A. Rotary cam angles (CB) will be equal to engine crank angles (CA) for two stroke cycle engines. For four stroke cycle engines, rotary cam angles are one half of engine crank angles;

For the dual cam plus phase changer driver of FIG. 4A, FIG. 4B and FIG. 4C, the instantaneous volumetric rate of increase of displacer volume during retraction, as required by equation D2, is achieved by the combined actions of the rotary cam, 102, the rocker plate, 97, and the rocker cam, 88, as follows:

$$d\left(\dfrac{VACA}{VD}\right) / d(CA) = \left[\dfrac{d(CB)}{d(CA)}\right]\left[\dfrac{d(RB)}{d(CB)}\right]\left[\dfrac{d(CRC)}{d(CRB)}\right]\left[\dfrac{d(RR)}{d(CRC)}\right]\left(\dfrac{AD}{VD}\right) \quad \text{Eqn. D3}$$

Wherein:

$\left[\dfrac{d(CB)}{d(CA)}\right]$ = Ratio of rotary cam angles (CB) to engine crank angles(CA) and a constant equal to 1.0 for 2 stroke cycle engines and 0.5 for 4 stroke cycle engines;

$\left[\dfrac{d(RB)}{d(CB)}\right]$ = Instantaneous rate of change of rotary cam radius(RBCA), relative to rotary cam angle (CB) at that position where rotary cam follower, 106, line of motion intersects the retraction portion, 104, of the rotary cam, 102, profile, as shown in Figure 11.

$\left[\dfrac{d(CRC)}{d(RB)}\right]$ = Instantaneous rate of change of rocker plate, 97, angle (CRCA) relative to change of rotary cam radius (RBCA) at crank angle (CA) and also rate of change of rocker cam angle (CRCA);

For the cam follower and connector, 106, between the rotary cam, 102, and the rocker plate, 97, as shown in FIG. 4A, the rate of change of rocker plate and rocker cam angle can be adequately approximated as a constant, as follows:

$$\dfrac{d(CRC)}{d(RB)} = \dfrac{1}{(RRF)} = \dfrac{1}{[\text{Rocker Plate Radius to Connector, 106}]}$$

$\dfrac{d(RR)}{d(CRC)}$ = Instantaneous rate of change of rocker cam, 88, radius (RRCA), relative to change of rocker cam angle (CRCA) at that position where the displacer piston cam follower, 117, line of motion intersects the retraction portion, 89, of the rocker cam, 88, profile, as shown in Figure 10;

Approximately, then, only the two cam profiles are variables to be designed to achieve the required instantaneous rate of displacer piston retraction and displacer volume increase during retraction. This required rate of motion can be distributed in several different ways between the rotary cam, 102, profile and the rocker cam, 88, profile.

For an illustrative example, the following assumptions are used for a two stroke cycle engine such as shown in FIG. 1:

1. The angular extent of the retractor portions, 89, and 104 of the rocker and rotary cams are equal:

[(CRCS)-(CRCE)]=[(CBS)-(CBE)]=[(CAS)-(CAE)]

2. The radial extent of the retractor portions, 89 and 104, of the rocker and rotary cams are equal:

[(RBO)-(RBI)]=[(RRO)-(RRI)]

3. The rotary cam angular rate of change of radius is constant:

$$\frac{d(RB)}{d(CB)} = \text{Constant} = \frac{[(RBO)-(RBI)]}{[(CAS)-(CAE)]}$$

Hence also:

$$\frac{d(CRC)}{d(RB)} = \text{Constant} = \frac{[(CRCS)-(CRCE)]}{[(RBO)-(RBI)]} = \frac{1}{RRF}$$

With these assumptions equation D3 reduce to:

$$\frac{d\left(\frac{VACA}{VD}\right)}{d(CA)} = \left(\frac{AD}{VD}\right)\left[\frac{d(RR)}{d(CRC)}\right]$$

And equations D1 reduce to:

$$\frac{(VACA)}{(VD)} = \left(\frac{AD}{VD}\right)[(RRO)-(RRCA)] = \frac{[B-\cos(CA)]}{2} \frac{(F3)}{[1-(F3)]}$$

From which the rocker cam retractor profile, 89, of radius (RRCA) versus crank angle (CA) and also cam angle (CRCA) can be determined;

Wherein:

(RBO)=Outer radius of retractor portion, 104, of rotary cam, 102, as shown in FIG. 11;

(RBI)=Inner radius of retractor portion, 104, of rotary cam, 102, as shown in FIG. 11;

(CBS)=Rotary cam angle at start of retraction portion, 104;

(CBE)=Rotary cam angle at end of retraction portion, 104;

(CBCA)=Rotary cam angle during retraction at engine crank angle (CA);

(CRCS)=Rocker cam angle at start of retraction portion, 89, as shown in FIG. 10;

(CRCE)=Rocker cam angle at end of retraction portion, 89, as shown in FIG. 10;

The range of angular adjustment of the phase changer coupling, 98, is equal to the angular extent, 95, of the retractor portion, 89, of the rocker cam, 88, so that the full range of adjustment of displacer piston retraction can be used to adjust engine torque.

The rocker cam, 88, also drives the positive displacement fuel injector pump, 92, plunger, 91, via the rocker cam injector portion, 90, and injector cam follower, 118, as shown in FIG. 4C and FIG. 10. For this illustrative example, the following additional assumptions are used:

4. The rocker cam angular rate of change of radius for the fuel injector portion, 90, is constant. Hence, for a liquid fuel, the mass rate of liquid fuel injection per crank angle is also constant:

$$\frac{[(RFCA)-(RFI)]}{[(CRCS)-(CRCA)]} = \frac{[(RFO)-(RFI)]}{[(CRCS)-(CRCE)]} \quad \text{Equation D4}$$
$$= \frac{d(RF)}{d(CA)}$$
$$= a \text{ constant}$$

(MFR)=Mass rate of injection of liquid fuel per crank angle $$(MFR) = (AF)(DF)\frac{d(RF)}{d(CA)} = \frac{MFM}{[(CRCS)-(CRCE)]}$$

(MFM)=(AF)(DF)[(RFO)−(RFI)]

Wherein:

(RFI)=Inner radius of injector portion, 90 of rocker cam, 88, as shown on FIG. 10;

(RFO)=Outer radius of injector portion, 90, of rocker cam, 88, as shown on FIG. 10;

(RFCA)=Radius of rocker cam injector portion, 90, at centerline of injector plunger, 91, rotary cam follower, 118, as shown on FIG. 4C and FIG. 10;

(DF)=Fuel density;

(AF)=Area of fuel injector plunger, 91;

The several equations D4 define the relation between rocker cam radius (RFCA) and rocker cam angle (CRCA) for the injector portion, 90, of the rocker cam, 88.

This Case B combination of constant fuel mass injection rate (MFR) with variable air mass flow rate (MAR) creates instantaneous displacer mixture air to fuel ratios which are different for each portion of the displacer mixture created in the mixer portion of the displacer volume, 13. The first displacer mixture portion, created at the start of retraction, is the richest in fuel and the last portion, created at the end of retraction, is the leanest in fuel, and mixture ratio varies linearly with engine crank angle (CA) between these limits, as follows:

$$\frac{(MAR)}{(MFR)} = \frac{(MA)}{(MF)}[(CAE)-(CAS)][a+b[(CA)-(CAS)]]$$

For engines using the flow passage, 18, of FIG. 1 and FIG. 4C, both for air transfer into the displacer volume and for subsequent mixture delivery into the engine combustion chamber, 6, this pattern of variation of mixture ratio between portions of the displacer mixture may be preferred. The first portion created will be the last to be delivered and will have the longest residence time in the displacer volume. Hence this first portion is preferably the fuel richest, in order to have the longest compression ignition delay time interval. The last portion created will be the first to be delivered and will have the shortest residence time in the displacer volume. Hence this last portion can be made fuel leanest since it does not need a long compression ignition delay time interval. This variable air mass flow rate example of Case B provides this advantageous pattern of variation of mixture ratio between portions of the displacer mixture.

This Case B is an illustrative example and other patterns of variation of mixture ratio between displacer mixture portions can alternatively be assumed. Solutions of equations B1 and B2 will not always be possible in equation form for all possible mixture variation patterns.

The engine designer has considerable latitude in selecting several design factors, such as the crank angles for starting and stopping the displacer piston retraction; the range of variation of mixture ratio between portions; the rotary cam and rocker cam profiles; etc.

E. Engine Cylinder Pressure Driving, Case C:

As shown in FIG. 2 and 3, engine cylinder pressure can be used to drive both displacer piston retraction and concurrent fuel injection. For this example Case C combination, the volumetric ratio of displacer piston retraction rate to fuel injection rate is essentially constant, since both are set by liquid bleed flow, driven by the same engine combustion chamber pressure. However, the ratio of instantaneous mass rate of air flow into the displacer volume (MAR) to instantaneous mass rate of fuel injection into the displacer volume (MFR) at engine crank angle (CA) varies during displacer piston retraction. The mass rate of fuel flow is directly proportional to the volumetric rate of fuel flow since liquid fuel density varies only slightly with pressure. But the mass rate of air flow is proportional partly to the volumetric rate of volume increase, and partly to the increase of air density within the displacer volume and also within the air being transferred thereinto, since air density varies greatly with pressure. As displacer piston retraction progresses and engine cylinder pressure rises during the compression time interval, instantaneous air mass flow rate rises relative to instantaneous fuel mass injection rate and the instantaneous mixture ratio of the displacer mixture portion being created becomes fuel leaner in consequence.

The instantaneous volumetric rate of displacer piston retraction and fuel injection (VFR), both driven by varying engine cylinder pressure, can be estimated via the following approximate relations, using conventional fluid flow relations:

$$\frac{d\frac{(VACA)}{(VD)}}{d(CA)} = \left(\frac{KHB}{VD}\right)\left(\frac{AD}{AHD}\right)\left(\frac{VCA}{VD}\right)^{-\frac{2}{3}}; \quad \text{Equation E1}$$

$$\left(\frac{VFR}{VFM}\right) = (KFI)\left(\frac{VCA}{VD}\right)^{-\frac{2}{3}} = \frac{(MFR)}{(MFM)}; \quad \text{Equation E2}$$

Substituting the displacer retraction rate and engine piston displacement rate into equation B1 provides the following approximate relation for the specific instantaneous air mass flow rate into the displacer volume:

$$\frac{(MAR)}{(MA)} = \left(\frac{KHB}{VD}\right)\left(\frac{AD}{AHD}\right)[(F51)-(F6)]$$

From which the instantaneous air to fuel ratio of the displacer mixture portion being created can be estimated as follows:

$$\frac{(MAR)}{(MFR)} = (KAF)(QCA)$$

Wherein:

$$(KHB) = \frac{(AB)(CB)(60)}{(2\text{pi})(RPM)}\sqrt{\frac{2g}{(DH)}}\sqrt{\left[1+\frac{1}{CRO-1}\right]^{\frac{4}{3}}\left(\frac{AD}{AHD}\right)(PCI)}$$

$$(KFI) = \frac{(AI)(CI)(60)(DF)}{(2\text{pi})(RPM)(MF)}\sqrt{\frac{2g}{DF}}\sqrt{\left[1+\frac{1}{CRO-1}\right]^{\frac{4}{3}}\frac{(AC-AP)}{(AP)}(PCI)}$$

$$(F5) = \frac{1}{\left[\frac{B-\cos(CA)}{2}\right]^{\frac{5}{3}}(KB)^{\frac{8}{3}}}$$

$$(F6) = \frac{[\sin(CA)](F7)[(CA)-(CAS)]}{2\left[\frac{B-\cos(CA)}{2}\right]^{2}(KB)^{2}}$$

(F7)=Approximately 3.13 or somewhat more closely,

[2.74+1.31[(CA)−(CAS)]]

(KAF)=A constant geometric and density factor;

$$(KAF) = \frac{(AB)(CB)(DAI)}{(AI)(CI)(DF)}\sqrt{\frac{DF}{DH}}\left[\frac{AD}{AHD}\right]^{\frac{3}{2}}\sqrt{\frac{(AP)}{[(AC)-(AP)]}}$$

(QCA)=A variable engine crank angle factor;

(QCA)=[(F8)−(F9)]

$$(F8) = \frac{2}{[B-\cos(CA)](KB)^2}$$

$$(F9) = \frac{[\sin(CA)](1.26\ F7)[(CA)-(CAS)]}{[B-\cos(CA)]^{\frac{4}{3}}(KB)^2}$$

(AB)=Flow area of the hydraulic bleed flow restriction, 61;

(AI)=Flow area of the fuel injector nozzle, 85;

(CB)=Flow coefficient of bleed flow restriction, 61;

(CI)=Flow coefficient of fuel injector nozzle, 85;

(VFM)=Maximum liquid fuel volume injected into displacer volume per cycle;

(DAI)=Engine intake air density;

(RPM)=Engine speed;

(g)=Gravitational constant;

(PCI)=Engine intake air pressure;

(VFR)=Instantaneous volumetric fuel flow rate;

(DF)=Liquid fuel density;

(DH)=Density of hydraulic fluid used in hydraulic bleed cylinder, 59;

(AD)=Area of displacer piston, 11;

(AHD)=Area of displacer drive piston, 57;

(AP) Area of fuel injector plunger, 74;

(AC)=Area of fuel injector drive piston, 76;

(CA)=Variable crank angle radius during displacer piston retraction;

(CAS)=Engine crank angle, radians, at start of displacer piston retraction and becomes earlier during compression time interval as engine torque increases;

(CAE)=Engine crank angle, radians, at end of displacer piston retraction and start of displacer mixture delivery into engine combustion chamber;

(KB)=1.0+0.6[(CA)−(CAS)]

The designer has considerable latitude in selecting the crank angles (CAS) and CAE) for the start and end of displacer piston retraction and fuel injection at maximum engine torque and fuel quantity (MFM). A narrower crank angle duration of displacer piston retraction, or a later start of retraction, will yield a smaller range of variation of mixture ratio between portions of the displacer mixture, since a smaller range of variation of engine cylinder pressure will be used for driving. Values of maximum required displacer volume (VACAE Max) and maximum fuel mass per cycle (MFM) can be calculated as described earlier here and used to calculate required values of (KHB) AND (KFI) as follows:

$$\frac{(VACAEMax)}{(VD)} = \int_{CAS}^{CAE} \frac{d\left(\frac{VACA}{VD}\right)}{d(CA)} d(CA)$$

$$= \frac{(RHB)(CA)}{(VD)(AHD)} \int_{CAS}^{CAE} \left(\frac{VCA}{VD}\right) d(CA)$$

$$(MFM) = \int_{CAS}^{CAE} (MFR) d(CA)$$

$$= (MFM)(KFI) \int_{CAS}^{CAE} \left(\frac{VCA}{VD}\right)^{-\frac{2}{3}} d(CA)$$

$$\int_{CAS}^{CAE} \left(\frac{VCA}{VD}\right)^{-\frac{2}{3}} d(CA) = (F7)[(CAE) - (CAS)];$$

Approximately

From these estimated values of (KHB) and (KFI), the needed bleed orifice areas, fuel injector nozzle flow areas and other dimensions can be sized.

These various approximate sizing relations are only useable for engine crank angles during the compression time interval and preferably the latter portions thereof.

The fuel richest displacer mixture portion is that first created at the start of displacer piston retraction and the fuel leanest portion is that last created at the end of displacer piston retraction. The ratio of these two mixture ratios can be estimated as the ratio of the two crank angle factors (QCA):

$$\frac{\text{Air to fuel ratio of leanest portion}}{\text{Air to fuel ratio of richest portion}} = \frac{(QCAE)}{(QCAS)}$$

The first portion of the displacer mixture created is also the fuel richest portion and thus the portion with the longest compression ignition time delay period. This is also the portion last to be delivered into the engine combustion chamber, for those forms of this invention using the same flow passage, 18, for both air transfer into the displacer volume and displacer mixture transfer out of the displacer volume. Hence, that displacer mixture portion with the longest compression ignition time delay is also that displacer mixture portion with the longest residence time in the displacer volume. Also the last created displacer mixture portion with the fuel leanest mixture ratio and hence the shortest compression ignition time delay, is that displacer mixture portion with the shortest residence time in the displacer volume. This approximate matching of compression ignition time delay period to residence time is one advantage of the form of this invention illustrated in FIGS. 2 and 3, since fuel leaner overall displacer mixture ratios can be used with consequent reductions in soot formation. This form of the invention may be preferred in those applications where the same flow passage is used for both air transfer into the displacer volume and displacer mixture delivery into the engine combustion chamber.

As engine speed increases, a longer crank angle duration of fuel injection and displacer piston retraction is required for the FIG. 2 and FIG. 3 form of the invention, for the same engine torque and fuel mass per cycle. Hence this engine cylinder pressure driver of both the displacer piston and the fuel injector will preferably be used on engines operating only over a moderate range of engine speed.

An alternative form of this invention could retain the cylinder pressure driver of the displacer piston, but in combination with a common rail fuel injector such as that used in the FIG. 1 form of the invention. This common rail fuel injector is adequately compensated for engine speed. The cylinder pressure driver of the displacer piston could be compensated for changes of engine speed by increasing the flow area (AB) of the bleed flow restriction, 61, in proportion to engine speed increase.

F. Displacer Mixture Delivery for Case A, Cam Plus Hydraulic Adjuster Drive Scheme:

The delivery portion, 51, of the rotary displacer drive cam, 19, functions to drive the displacer piston, 11, fully into the displacer volume, 13, starting at the end of retraction at engine crank angle (CAE) and finishing at engine crank angle (CAD), in order to deliver the displacer fuel air mixture into the engine combustion chamber, 6, where ignition and combustion can take place. In principal, various rate schedules of delivery of displacer mixture into the combustion chamber can be used, each rate schedule requiring a particular profile for the delivery cam profile, 51. For example, a constant rate of displacer piston delivery motion can be obtained by using a delivery cam profile, as described approximately by the following dimensionless equations, and as shown in FIG. 7.

$$\frac{(RDO) - (RMCA)}{(RDO) - (RDI)} = \frac{(CAD) - (CAM)}{(CAD) - (CAE)} \quad \text{Equation F1}$$

$$= \frac{(VMCA)}{(VAM)}$$

Wherein:
(CAD)=engine crank angle in radians at end of delivery of displacer mixture into engine combustion chamber, and preferably at or before the end of the compression time interval. At latest early during the following expansion time interval;
(CAM)=Engine crank angle in radians when delivery cam radius equals (RMCA) to the center of the rotary cam follower, 21, and when remaining displacer volume equals (VMCA);

A reversal of flow direction during displacer mixture delivery could, theoretically, occur prior to the end of the compression time interval, since pressure is increasing in the variable volume chamber. To avoid such flow reversal, the angular duration of delivery (CAD−CAE), in radians, is to be less than the absolute value of the following quantity:

$$\left[\frac{B - \cos(CAE)}{\sin(CAE)}\right] \quad \text{Equation F2}$$

Equation F1 defines the relation between rotary displacer drive cam, 19, cam radius (RMCA), and cam angle (CAM) for the delivery portion, 51, of this cam. The designer has some latitude in choosing the cam angle (CAD) for completion of delivery of the displacer mixture into the engine combustion chamber, 6, as described hereinabove.

The rotary delivery cam, 25, of FIG. 1, operative upon the delivery piston, 26, carries out two functions when connected to the hydraulic adjuster volume, 24, by opening of delivery valve, 33, and closing of bypass valve, 34; the retraction motion of the displacer piston, 11, is stopped; concurrently delivery motion of the displacer piston commences prior to reaching maximum displacer piston retraction at engine crank angle (CAE) of FIG. 7, by pumping sufficient hydraulic fluid into the hydraulic adjuster volume, 24. For the FIG. 1 example form of this invention, with constant instantaneous air mass flow rate, obtained by use of the FIG. 7 displacer drive cam, 19, with cam profile as described hereinabove the rotary delivery cam, 25, shown in FIG. 8, can be used with the delivery portion, 38, profile described by the following approximate, dimensionless, equations:

$$\frac{(AP)[(RPO)-(RPI)][(CAD)-(CAE)]}{(AJ)[(RDO)-(RDI)][CAG)-(CAS)]} \quad \text{Equation F3}$$

Is to equal:

$$1+\left(\frac{MAR}{MA}\right)\frac{[B-\text{Cos}(CAS)]}{2}\frac{(VD)}{(AD)}\frac{[(CAD)-(CAE)]}{[(RDO)-(RDI)]}$$

$$\frac{[(RPCAF)-(RPI)]}{[(RPO)-(RPI)]} = \frac{[(CAF)-(CAS)]}{[(CAG)-(CAS)]} \quad \text{Eqn. F4}$$

Wherein:

(AP)=Area of delivery piston, 26;

(AJ)=Area or cam piston, 20, and displacer drive piston, 23;

(RPO)=Outer radius of rotary delivery cam, 25, to center of roller cam follower, 27;

(RPI)=Innermost radius of rotary delivery cam, 25, to center of roller cam follower, 27;

(CAG)=Cam angle, and engine crank angle, during compression time interval when delivery piston pumping motion ends;

The cam angle (CAG) of rotary delivery cam, 25, is to equal or exceed cam angle (CAE) of rotary displacer drive cam, 19;

(RPCAF)=Radius of rotary delivery cam, 25, to center of roller cam follower, 27, on cam delivery portion, 38, when cam angle is (CAF), as shown in FIG. 8;

Equation F3 defines the relation between the rotary delivery cam inner (RPI) and outer (RPO) radii, and the angular extent [(CAG)−(CAS)] of the delivery portion, 38, of the rotary delivery cam, 25. The designer has considerable latitude in choosing the several piston areas (AD), (AP), (AJ). Equation F4 defines the relation between rotary delivery cam, 25, radius (RPCAF), and cam angle (CAF), along the delivery portion, 38, of this cam.

The suction portion, 56, of the rotary delivery cam, 25, and the delivery return spring, 29, return the delivery piston, 26, to the starting position during the engine exhaust and intake time interval. Delivery valve, 33, is closed, and bypass valve, 34, is opened during the engine exhaust and intake time interval.

Any consistent system of units can be used in these approximate equations.

During retraction:

G. Dual Cams Plus Phase Changer, Mixture Delivery: Case B Example with Vario $$\left(\frac{MAR}{MA}\right)$$

During retraction:

Various profiles can be used for the delivery portion, 105, of the rotary cam, 102, but all are to use an angular duration of delivery [(CBD)−(CBE)], in radians, which is less than the absolute value of the following quantity, in order to avoid flow reversal during displacer mixture delivery:

$$\left[\frac{B-\text{Cos}(CBD)}{\text{Sin}(CBD)}\right]$$

An example profile for the delivery portion, 105, of the rotary cam, 102, can be used, as described approximately by the following dimensionless equations, and as shown in FIG. 11:

$$\frac{[(RBO)-(RBCD)]}{[(RBO)-(RBI)]} = \frac{[(CBCD)-(CBE)]}{[(CBD)-(CBE)]} \quad \text{Equation G1}$$

Wherein:

(CBE)=Engine crank angle, and rotary cam, 102, angle for 2 stroke cycle engine example of FIG. 1, when displacer piston retraction stops and displacer mixture delivery commences, as shown on FIG. 11, during latter part of compression time interval;

(CBD)=Engine crank angle and rotary cam, 102, angle, when delivery of displacer mixture into engine combustion chamber will have ended, preferably prior to the end of the compression time interval, as shown in FIG. 11;

(RBO)=Outer radius of rotary cam, 102; as shown in FIG. 11;

(RBI)=Inner radius of rotary cam, 102;

(RBCD)=Radius of rotary cam, 102, to center of roller cam follower, 106, on cam delivery portion, 105, when cam angle is (CBCD) as shown in FIG. 11;

H. Displacer Mixture Delivery for Case C, Engine Cylinder Pressure Driving:

The rotary delivery cam, 64, of FIG. 2, operates upon the delivery piston, 67, to stop retraction of the displacer piston, 11, and to commence delivery motion thereof, by opening delivery valve, 33, and closing bypass valve, 34, and closing bleed valve, 60. For a constant rate of displacer piston delivery motion, a delivery cam profile for the delivery portion, 65, can be used, as described approximately by the following dimensionless equations, and as shown in FIG. 9:

$$\frac{[(RFCAY)-(RFI)]}{[(RFO)-(RFI)]} = \frac{[(CAY)-(CAX)]}{[(CAZ)-(CAX)]} \quad \text{Equation H1}$$

(AR)[(RFO)−(RFI)];is to be greater than:

$$\frac{(AJ)}{(AD)}(VAM)$$

Wherein:

(VAM)=Maximum displacer volume;

(AJ)=Area of hydraulic bleed piston, 57;

(AR)=Area of delivery pump piston, 67;

(AD)=Area of displacer piston, 11;

(CAX)=Engine crank angle and delivery cam, 64, angle for 2 stroke cycle engine example of FIG. 2, when displacer piston retraction stops and displacer mixture delivery commences, during latter portion of compression time interval;

(CAZ)=Engine crank angle and delivery cam, 64, angle, when delivery of displacer mixture into engine combustion chamber has already ended, preferably prior to the end of the compression time interval;

(RFO)=Outer radius of rotary delivery cam, 64, as shown in FIG. 9;

(RFI)=Inner radius of rotary delivery cam, 64, as shown in FIG. 9;

(RFCAY)=Radius of delivery cam, 64, to center of roller cam follower, 66, on cam delivery portion, 65, when cam angle is (CAY), as shown in FIG. 9;

To avoid flow reversal during displacer mixture delivery, the angular duration of delivery [(CAZ)–(CAX)], in radians, is to be less than the absolute value of the following quantity:

$$\left[ \frac{B - \text{Cos}(CAZ)}{\text{Sin}(CAZ)} \right]$$

The question H1 defines the relation between rotary delivery cam, 64, cam radius (RFCAY), and cam angle (CAY), for the delivery portion, 65, of this cam. The designer has some latitude in choosing the several cam angles and piston areas.

Alternative Combinations

A few illustrative examples of fuel air mixers and proportioners of this invention are described hereinabove, but it is not intended thereby to limit the invention to these few examples, out of the many possible combinations of displacer piston drivers, with fuel injector systems suitable for use with this invention. Even within the limits of the apparatus described herein, several alternative combinations are suitable, as for example:

1. The hydraulic bleed and delivery pump displacer piston driver can be used in combination with a common rail fuel injector, as described hereinabove;
2. The dual cams plus phase changer displacer piston driver, in combination with a common rail fuel injector, could be designed to create a displacer mixture, all of whose portions had essentially the same mixture ratio;
3. The cam plus hydraulic adjuster displacer piston driver could be used in combination with a cam driven fuel injector and designed to create a displacer mixture with differing mixture ratios between portions;

Alternative displacer piston drive means are also described in U.S. Pat. No. 5,899,195, which are suitable for use with this invention.

The overall displacer mixture ratio (DAF) can be adjusted in various ways, as for example, the following:

1. The fuel flow restriction, 46, flow area, on a common rail fuel injector, such as shown in FIG. 1, can be increased or decreased;
2. The flow area of the hydraulic bleed flow restriction, 61, such as shown in FIG. 2, can be increased or decreased;

For adjustments to adapt an engine to a different fuel possessing different compression ignition time delay characteristics, such adjustments could be made by hand. For adjustments to compensate for changes in engine speed or supercharge, such adjustments could be made automatically, by use of suitable sensor and controller and actuator devices.

The hydraulic type displacer piston drivers, such as those shown in FIG. 1 and FIG. 2, may be preferred when ease of adjustment of overall displacer mixture ratio (DAF) is desired. But hydraulic fluid throttling losses may make these forms of the invention preferred only for low or moderate speed engines. For engines operated at higher speeds, mechanical type displacer piston drivers, such as shown in FIG. 4A, 4B, and FIG. 4C, may be preferred.

Liquid fuel injection systems are described herein, but gas fuels and gas fuel injection systems can also be used on fuel air mixers and proportioners of this invention. Common rail systems have been used for gas fuel injection at high pressure, and are somewhat similar to the common rail liquid fuel injector shown in FIG. 1.

A fuel air mixer and proportioner of this invention comprises several elements, as described hereinabove, together with a combination of a displacer piston driving means, and a fuel injection means, which concurrently mix the injected fuel into an air mass undergoing transfer into a displacer volume, so that the resulting air fuel mixture, thusly created within the displacer volume, possesses in all portions an air to fuel ratio, sufficiently fuel richer than stoichiometric, that the shortest compression ignition time delay period therein is longer than the longest residence time within the displacer volume.

Separate Flow Passages

By delivering the displacer mixture into the engine combustion chamber at several different places, more complete utilization of the engine air mass can be achieved. As shown in FIG. 6, the flow passage, 18, between the displacer volume, 13, and the variable volume chamber, 6, can comprise several separate passages, 119, 120, 121, into the engine combustion chamber. Several separate combustion zones will thus be created, resulting in more complete reaction of the air mass retained within the combustion chamber. By using fuel air mixers and proportioners of this invention, this beneficial object can be achieved with but a single fuel injector, 40, whereas prior art in cylinder stratifiers require more injectors to achieve a similar result.

The displacer mixture can also be delivered into the engine combustion chamber, not only via several separate delivery flow passages, as shown in FIG. 6, but also in separate pulses at different times, by using several separate valved delivery passages, 122, 123, as shown in FIG. 5. Each separate delivery passage, 122, 123, comprises a valve, 124, 125, which can be opened and closed by action of the controller, 126, as by use of solenoid valve drivers with an electric or electronic controller. The controller, 126, responsive to an engine torque signal, c, and an engine crank angle sensor, 48, with signal, a, can operate on delivery flow passage valves 124, 125, to cause a time and position dispersed delivery of displacer mixture into the combustion chamber, 6, resulting in a time and position dispersed occurrence of mixture ignition and burning. Such time and position dispersed occurrence of combustion can be utilized to prevent excessive rate of rise of pressure and noise of combustion, as is described in U.S. Pat. No. 5,967,100, col. 5 line 46, through col. 6 line 19, and this material is incorporated herein by reference thereto. Methods for achieving such time and position dispersal of combustion are also described in U.S. Pat. Nos. 5,899,195 and 5,899,188.

Also shown in FIG. 5 is the use of a separate unidirectional flow passage, 127, with valve, 128, for the flow of air from the variable volume chamber, 1, into the displacer volume, 13. The valve, 128, is opened and closed by the controller, 126, so that this valve is open only when displacer piston retraction is taking place. The controller also opens delivery valves, 124, 125, only when displacer mixture delivery into the combustion chamber, 6, is to occur. The delivery pipe, 129, can extend deeply into the displacer piston, 11, via the recess, 130, whose inside diameter is larger than the outside diameter of the delivery pipe. With this recessed delivery pipe, the portion of displacer mixture first created during displacer piston retraction can also be the portion first delivered into the combustion chamber during delivery. Also the portion of displacer mixture last created during retraction can also be the portion last delivered into the combustion chamber. In this way the residence times of the various portions of the displacer mixture within the displacer volume, 13, can be more nearly equal. In this way a more nearly uniform mixture ratio can be used for all portions of the displacer mixture.

Beneficial Objects

The beneficial objects achievable by use of the fuel air mixers and proportioners of this invention are similar to those of the stratifier apparatus for engines, as described in U.S. Pat. No. 5,899,195, which can be briefly summarized as follows:

1. Since stratified air fuel mixtures are created and burned within the engine combustion chamber, intake air throttling is not used. Engine efficiency is improved, since the air pumping work loss due to throttling is avoided;
2. Engine efficiency can be further improved by use of smaller displacement engines operating at lower speeds and using very high intake air supercharge to achieve adequate torque and power. Gasoline engine knock is avoided, since stratified air fuel mixtures are burned;
3. Exhaust smoke and odor are reduced, since air and fuel are premixed and preevaporated in the displacer volume. This displacer mixture is subsequently transferred into the engine combustion chamber, where ignition and burning take place in a fuel air mixture containing reduced quantities of unevaporated liquid fuel, a primary source of soot and exhaust smoke and odor;
4. Combustion does not occur within the displacer volume but only in the engine combustion chamber. The higher jacket heat losses and engine efficiency losses characteristic of antechamber and prechamber combustion systems are thus avoided;

These beneficial objects are described in more detail in U.S. Pat. No. 5,899,195 at the following places: Summary, col. 3, 1 43, through Col 4, 1 39; col 7, 1 57 through col 8, 1 62; col 19, 1 61 through col 20, 1 2; col 21, 1 26, through col 22, 1 50; and this material is incorporated herein by reference thereto.

To assure that combustion does not occur within the displacer volume of a fuel air mixer and proportioner of this invention, the compression ignition delay time periods for each portion of the displacer air fuel mixture created there is to be longer than the residence time of each portion within the displacer volume prior to delivery into the engine combustion chamber. For both the stratifier apparatus for engines of U.S. Pat. No. 5,899,195 and the fuel air mixers and proportioners of this invention, the compression ignition time delay periods are lengthened, as thusly needed, by fuel enrichment of the displacer mixture to mixture ratios appreciably fuel richer than the stoichiometric ratio.

It is in this fuel enrichment process for the displacer mixture that the fuel air mixers and proportioners of this invention are an improvement over the stratifier apparatus for engines of U.S. Pat. No. 5,899,195.

The compression ignition time delay period of each portion of the displacer mixture can be more closely matched to the residence time of each portion within the displacer volume by use of this invention. In consequence, the air to fuel ratio of each portion of the displacer mixture can be made no more fuel richer than necessary to prevent occurrence of compression ignition anywhere within the displacer volume. Thus the overall fuel to air ratio of the displacer mixture can be as fuel lean as possible, and subsequent soot formation and exhaust smoke and odor can be minimized, and this is a principal beneficial object of the fuel mixers and proportioners of this invention.

This beneficial object can be achieved by coordinating the entry of air into the displacer volume with the injection of fuel into the displacer volume as follows:

1. Into each air portion as it enters the displacer volume, that fuel quantity is injected and mixed therewith, which will yield a fuel air mixture whose compression ignition time delay exceeds the residence time of that portion while within the displacer volume;
2. All fuel quantities are thusly injected and mixed into entering air portions;
3. Preferably those displacer mixture portions which remain longer in the displacer volume will be fuel richer than those portions which have a shorter residence time therein;
4. A fuel air mixer and proportioner of this invention thusly coordinates the flow of air into the displacer volume, with the concurrent injection of fuel thereinto by the instantaneous rate of retraction of the displacer piston, relative to the concurrent instantaneous rate of injection of fuel. Thus the displacer piston retraction driver and the fuel injection driver are to function as a combination during the retraction and injection process.

Having thus described my invention, what I claim is:

1. In a piston internal combustion engine comprising: at least one combined means for compressing and expanding gases, each said combined means comprising an internal combustion engine mechanism comprising a variable volume chamber for compressing and expanding gases, and drive means for driving said internal combustion engine mechanism and varying the volume of said chamber through repeated cycles; said variable volume chamber comprising a combustion chamber end at the minimum volume portion of said variable volume;

each said variable volume cycle comprising a compression time interval, when said variable volume is sealed and decreasing, followed by an expansion time interval, when said variable volume is sealed and increasing, these two time intervals together being a compression and expansion time interval;

each said combined means for compressing and expanding further comprising intake means for admitting reactant gases into said variable volume chamber prior to each said compression time interval, exhaust means for removing reacted gases from said variable volume chamber after each said expansion time interval; and ignition means for igniting fuel air mixtures within said variable volume chamber;

each said variable volume cycle further comprising an exhaust time interval when said variable volume is opened to said exhaust means, followed by an intake time interval when said variable volume is opened to said intake means, these two time intervals being an exhaust and intake time interval; said exhaust and intake time interval following after a preceding expansion time interval and preceding a next following compression time interval; said piston internal combustion engine further comprising a source of supply of reactant gas containing appreciable oxygen gas, to each said intake means for admitting reactant gases into said variable volume chamber, each cycle of said variable volume chamber further comprising a potential combustion time interval comprising that portion of said compression and expansion time interval during which fuel form any source, and reactant gas containing appreciable oxygen gas, are both present within said variable volume chamber; each cycle of said variable volume chamber further comprising a combustion time interval during which the fuel and oxygen contents of the variable volume chamber are ignited and burned therein;

wherein the improvement comprises adding to said piston internal combustion engine at least one fuel in air mixer and proportioner apparatus for each said variable volume chamber of said piston internal combustion engine;

each said fuel in air mixer and proportioner apparatus comprising:

a displacer piston sealably operative within a displacer cylinder;

a displacer volume enclosed between said displacer cylinder and said displacer piston;

at least one flow passage between said displacer volume and said variable volume chamber and connecting into said variable volume chamber at the combustion chamber end thereof;

combination retraction and injection means for retracting said displacer piston, and for injecting fuel concurrently into the air mass flow from said variable volume into the displacer volume created by said retraction, said combination retraction and injection means comprising:

a source of fuel;

fuel injector means for transferring fuel from said source, and injecting it into said displacer volume, and comprising; injector adjustment means for adjusting the rate and quantity of fuel injection, into said displacer volume, during each engine cycle, said fuel quantity being adjusted in response to required engine torque output;

displacer piston retraction means for retracting said displacer piston to create a displacer volume, and comprising retraction adjuster means for adjusting the rate and extent of said displacer piston retraction;

said displacer piston retraction means and said fuel injector means, operating in combination, so that each air portion is admixed with a fuel portion, while being transferred from said variable volume chamber into said displacer volume; each fuel portion is admixed with an air portion being transferred while being injected into said displacer volume; said displacer piston retraction and concurrent fuel injection commence during the latter portion of said compression time interval and end prior to the end of said compression time interval;

said concurrent mixing of air and fuel within the mixer portion of said displacer volume where air and fuel enter, creates a displacer air fuel mixture;

delivery means for driving said displacer piston fully into said displacer volume and displacing said displacer mixture out of said displacer volume and into said combustion chamber end of said variable volume chamber, via said flow passage, so that said driving commences after completion of said displacer piston retraction and ends at latest during the early portion of the following expansion time interval;

and so that said delivery means drives said displacer piston into said displacer volume at a sufficient rate to achieve unidirectional flow of said displacer mixture, out of said displacer volume and into said engine combustion chamber via said flow passage;

said displacer piston retraction means and said fuel injector, further operating in combination, so that the instantaneous ratio of the mass rate of transfer of air from said variable volume chamber into said displacer volume to the instantaneous mass rate of injection of fuel into said air mass undergoing transfer, is always fuel richer than the stoichiometric mixture ratio for the fuel being used;

whereby a stratified air fuel mixture can be created in the engine combustion chamber which can be ignited and burn only therein, with low combustion violence and low exhaust smoke.

2. In a piston internal combustion engine, as described in claim 1:

wherein said displacer piston retraction means and said fuel injector means further operating in combination so that, the fuel air mass ratio, of each portion of said displacer mixture, is sufficiently fuel richer than said stoichiometric mixture ratio, that the compression ignition time delay period of each portion, exceeds the time interval between the mixing of each said portion, and the delivery of that portion into said variable volume chamber.

3. In a piston internal combustion engine, as described in claim 1:

wherein said displacer piston retraction means and said fuel injector means further operating in combination so that the instantaneous ratio of the mass rate of transfer of air from said variable volume chamber into said displacer volume, to the instantaneous mass rate of injection of fuel into said air mass undergoing transfer, is always fuel richer than the rich flammable limit mixture ratio for the fuel being used.

4. In a piston internal combustion engine as described in claim 2, wherein said combination retraction and injection means further comprises instantaneous displacer mixture change means for changing the instantaneous fuel to air ratio of different portions of said overall displacer mixture, so that those displacer mixture portions first created by said combination retraction and injection means, during each retraction of said displacer piston, are fuel richer than all subsequently created portions; and those displacer mixture portions last created by said combination retraction and injection means, during each retraction of said displacer piston, are fuel leaner than all previously created portions.

5. In a piston internal combustion engine as described in claim 2, wherein said fuel in air mixer and proportioner apparatus further comprises:

at least two flow passages between said displacer volume and said combustion chamber end of said variable volume chamber.

6. In a piston internal combustion engine as described in claim 5, wherein at least one of said at least two flow passages comprising valve means for opening and closing said flow passage and control means for controlling said valve means, so that:

at least one flow passage is open while said displacer piston is being retracted to create said displacer volume;

at least one flow passage is open while said displacer piston is being driven into said displacer volume.

7. In a piston internal combustion engine as described in claim 3, wherein said fuel in air mixer and proportioner apparatus further comprising:

at least two flow passages between said displacer volume and said combustion chamber end of said variable volume chamber.

8. In a piston internal combustion engine as described in claim 7, wherein
at least one of said at least two flow passages comprising valve means for opening and closing said flow passage and control means for controlling said valve means, so that:
at least one flow passage is open while said displacer piston is being retracted to create said displacer volume;
at least one flow passage is open while said displacer piston is being driven into said displacer volume.

9. In a piston internal combustion engine as described in claim 5, wherein each said flow passage comprises unidirectional flow means for creating unidirectional flow through said passage; said unidirectional flow being from said variable volume chamber into said displacer volume for at least one flow passage; and said unidirectional flow being from said displacer volume into said variable volume chamber for at least one flow passage;
all of said at least two flow passages whose unidirectional flow is from said displacer volume into said variable volume chamber, further comprising: first in, first out piping means for directing the flow of said displacer mixture, caused by said delivery means for driving said displacer piston into said displacer volume, so that those displacer mixture portions first created by said combination retraction and injection means, during each said retraction of said displacer piston, are also the displacer mixture portions first to be delivered from said displacer volume into said combustion chamber end of said variable volume chamber.

* * * * *

UNITED STATES PATENT AND TRADEMARK OFFICE
CERTIFICATE OF CORRECTION

PATENT NO. : 6116207
DATED : Sept. 12, 2000
INVENTOR(S) : Joseph C. Firey

It is certified that error appears in the above-indentified patent and that said Letters Patent is hereby corrected as shown below:

Col 20, line 27; add, -- which will equal the overall displacer mixture ratio --;

Col 22, line 3; In equation D3, change the left hand side to read:

$$-- \frac{d(CB)}{d(CA)} \frac{d(RB)}{d(CB)} \frac{d(CRC)}{d(RB)} \frac{d(RR)}{d(CRC)} \frac{AD}{VD} --$$

Col 25, line 57; change, "(F5)", to, -- (F51) --;

Col 27, line 8; change, "(RHB)(CA)", to, -- (KHB)(AD) --;

Col 27, line 8: change, "$\frac{(VCA)}{(VD)}$" to -- $\frac{(VCA)-2/3}{(VD)}$ --

Signed and Sealed this

First Day of May, 2001

Attest:

NICHOLAS P. GODICI

Attesting Officer     Acting Director of the United States Patent and Trademark Office